(12) United States Patent
Sarapii

(10) Patent No.: US 12,528,605 B1
(45) Date of Patent: Jan. 20, 2026

(54) MULTI-PURPOSE UNMANNED AERIAL VEHICLE

(71) Applicant: MILVUS GROUP USA LLC, Boca Raton, FL (US)

(72) Inventor: Oksana Sarapii, Boca Raton, FL (US)

(73) Assignee: MILVUS GROUP USA LLC, Boca Raton, FL (US)

( * ) Notice: Subject to any disclaimer, the term of this patent is extended or adjusted under 35 U.S.C. 154(b) by 0 days.

(21) Appl. No.: 18/978,079

(22) Filed: Dec. 12, 2024

(51) Int. Cl.
| | |
|---|---|
| *B64U 10/25* | (2023.01) |
| *B64U 20/83* | (2023.01) |
| *B64U 20/87* | (2023.01) |
| *B64U 50/30* | (2023.01) |
| *B64U 70/70* | (2023.01) |

(52) U.S. Cl.
CPC ............ *B64U 10/25* (2023.01); *B64U 20/83* (2023.01); *B64U 20/87* (2023.01); *B64U 50/30* (2023.01); *B64U 70/70* (2023.01)

(58) Field of Classification Search
CPC ............ B64C 3/10; B64C 3/16; B64C 39/10; B64U 10/25; B64U 20/83; B64U 20/87; B64U 50/30; B64U 70/70
See application file for complete search history.

(56) References Cited

U.S. PATENT DOCUMENTS

| | | | | |
|---|---|---|---|---|
| 2,406,506 A | * | 8/1946 | Northrop | B64C 39/10 244/35 R |
| 2,412,646 A | * | 12/1946 | Northrop | B64C 39/10 244/45 R |
| 2,550,806 A | * | 5/1951 | Hammond | G05D 1/085 114/23 |
| 2,650,780 A | * | 9/1953 | Northrop | B64C 39/10 244/119 |
| 5,082,204 A | * | 1/1992 | Croston | B64C 39/066 244/89 |
| 5,779,190 A | * | 7/1998 | Rambo | B64U 50/13 244/54 |
| 5,813,628 A | * | 9/1998 | Hahl | B64C 39/00 244/218 |
| 5,893,535 A | * | 4/1999 | Hawley | B64C 3/00 244/119 |
| 5,909,858 A | * | 6/1999 | Hawley | B64C 3/00 244/45 R |

(Continued)

*Primary Examiner* — Medhat Badawi
(74) *Attorney, Agent, or Firm* — Defillo & Associates, Inc.; Evelyn A. Defillo

(57) ABSTRACT

A light multi-purpose unmanned aerial vehicles made according to the "flying wing" scheme for barraging/patrolling the territory in order to prevent penetrating enemy objects thereto by detecting and destroying thereof. The vehicle includes a center section, in which a fuselage is formed as a single unit with wing consoles. The fuselage has an S-shaped aerodynamic profile similar to that of the wing. The aerodynamic profiles of the wing and the fuselage are based on a standardized unified S-shaped wing profile. The wing has an aerodynamic profile, which is variable in cross-section width, is provided with leading and trailing edges, and combined with the aerodynamic profile of the fuselage along its peripheral cross-section. The width of the aerodynamic profile of the wing is gradually reducing by scaling to the value of 0.5 relative to the width of the profile in the transition zone from the fuselage to the wing console.

15 Claims, 12 Drawing Sheets

(56) References Cited

U.S. PATENT DOCUMENTS

| | | | | |
|---|---|---|---|---|
| 6,149,101 | A * | 11/2000 | Tracy | B64C 30/00 244/45 R |
| 6,179,248 | B1 * | 1/2001 | Putman | B64C 3/30 244/35 R |
| 6,578,798 | B1 * | 6/2003 | Dizdarevic | B64C 23/069 244/35 R |
| D508,013 | S * | 8/2005 | Rihn | D12/319 |
| 6,923,403 | B1 * | 8/2005 | Dizdarevic | B64C 1/0009 244/36 |
| 7,093,798 | B2 * | 8/2006 | Whelan | B64C 1/065 244/120 |
| 7,793,884 | B2 * | 9/2010 | Dizdarevic | B64C 39/12 244/36 |
| 8,302,908 | B1 * | 11/2012 | Kismarton | B64C 1/26 244/119 |
| 8,444,082 | B1 * | 5/2013 | Foch | B64U 70/50 244/49 |
| 8,657,053 | B2 * | 2/2014 | Novikov-Kopp | B60V 1/14 180/117 |
| D709,430 | S * | 7/2014 | Schwaiger | D12/330 |
| 10,899,451 | B2 * | 1/2021 | Saint-Marc | B64D 11/003 |
| 11,453,483 | B2 * | 9/2022 | Page | B64C 25/14 |
| 11,912,435 | B2 * | 2/2024 | Abramov | B64C 39/08 |
| 11,952,097 | B1 * | 4/2024 | Page | B64C 1/1423 |
| 12,139,256 | B1 * | 11/2024 | Page | B64C 1/22 |
| 12,296,950 | B1 * | 5/2025 | Davis | B64D 45/00 |
| 12,325,507 | B2 * | 6/2025 | Matyushev | B64C 39/024 |
| 2003/0116677 | A1 * | 6/2003 | Young | A63H 27/14 244/63 |
| 2003/0127561 | A1 * | 7/2003 | Somers | B64C 3/14 244/35 R |
| 2004/0195438 | A1 * | 10/2004 | Chamberlain | A63H 30/04 244/65 |
| 2004/0217234 | A1 * | 11/2004 | Jones | A61M 21/02 244/118.5 |
| 2004/0245379 | A1 * | 12/2004 | Clark | B64C 9/34 244/36 |
| 2007/0029440 | A1 * | 2/2007 | Shepshelovich | B64U 10/25 244/190 |
| 2007/0278353 | A1 * | 12/2007 | Shepshelovich | B64C 3/14 244/215 |
| 2008/0001028 | A1 * | 1/2008 | Kendall | B64U 30/12 244/75.1 |
| 2008/0121756 | A1 * | 5/2008 | McComb | B64C 15/02 244/60 |
| 2009/0014592 | A1 * | 1/2009 | Zha | B64C 21/025 244/199.4 |
| 2009/0212166 | A1 * | 8/2009 | Garreau | B64C 29/0033 244/100 R |
| 2010/0123047 | A1 * | 5/2010 | Williams | B64C 3/16 244/35 R |
| 2010/0252690 | A1 * | 10/2010 | Hothi | B64U 50/19 244/75.1 |
| 2011/0121130 | A1 * | 5/2011 | Odle | B64C 1/22 244/36 |
| 2011/0266081 | A1 * | 11/2011 | Novikov-Kopp | B60V 1/08 114/272 |
| 2014/0158812 | A1 * | 6/2014 | Luther | B64U 70/70 244/2 |
| 2014/0175215 | A1 * | 6/2014 | Gallant | B64F 1/30 244/36 |
| 2014/0239117 | A1 * | 8/2014 | Sommer | B64C 5/04 244/48 |
| 2016/0023748 | A1 * | 1/2016 | Kempshall | B64U 30/12 244/5 |
| 2016/0229518 | A1 * | 8/2016 | Kempshall | B64C 3/44 |
| 2019/0233099 | A1 * | 8/2019 | Lindsey | G05D 1/0816 |
| 2019/0263513 | A1 * | 8/2019 | Randall | B64C 27/22 |
| 2020/0207476 | A1 * | 7/2020 | Whitlock | B64C 39/10 |
| 2020/0307789 | A1 * | 10/2020 | Princen | B64D 33/06 |
| 2022/0001974 | A1 * | 1/2022 | Page | B64C 25/04 |
| 2022/0169371 | A1 * | 6/2022 | Strieker | B64U 50/19 |
| 2022/0212779 | A1 * | 7/2022 | Randall | B64C 5/12 |
| 2022/0355932 | A1 * | 11/2022 | Abramov | B64U 30/10 |
| 2022/0388633 | A1 * | 12/2022 | Page | B64C 25/04 |
| 2023/0192270 | A1 * | 6/2023 | Matyushev | B64C 1/22 244/118.1 |
| 2023/0257114 | A1 * | 8/2023 | Poh | B64C 27/20 244/7 A |
| 2025/0010988 | A1 * | 1/2025 | Pushp | B64U 10/25 |
| 2025/0083811 | A1 * | 3/2025 | Page | B64D 37/04 |

* cited by examiner

MULTI-PURPOSE UNMANNED AERIAL VEHICLE

FIELD OF THE INVENTION

The invention relates to aviation equipment, namely to light multi-purpose unmanned aerial vehicles (UAVs) made according to the "flying wing" scheme, and it can be used in military affairs, in particular for barraging/patrolling the territory in order to prevent penetrating enemy objects thereto by detecting and destroying thereof.

BACKGROUND OF THE INVENTION

Unmanned aerial vehicles (UAVs), or drones, have become important elements of modern aviation in both the civil and military spheres. Their use changes traditional approaches to conducting of the combat operations and has the potential for further development.

Military UAVs are used to provide for reconnaissance, surveillance and even to strike targets. They can reduce risks to pilots and ensure the ability to carry out missions on hazardous conditions. Combat tactics have undergone significant changes due to introducing UAVs, as they can operate in real time and transmit information directly to command posts.

However, despite their numerous advantages, the UAVs also have their drawbacks.

First, their visibility can make the remote control systems vulnerable. Modern technologies allow the enemy to detect and destroy UAVs using radar systems or electronic warfare. This emphasizes the need for continuous improvement in camouflage and protection technologies. In addition, remote control systems for the UAVs can also be the subjects to attack them. Hackers can try to intercept a control signal or even take control of a drone, which in fact can lead to serious consequences.

Second, many types of the UAVs require special runways or sites for launching and landing. This can limit their mobility and efficiency in some special situations.

One of the significant achievements in the development of the UAVs is the creation of the aerial vehicles based on the aerodynamic "flying wing" scheme. Such a design has several advantages, including low visibility. The "flying wing" designs have smaller radar signatures as compared to traditional aerial vehicle due to the absence of large control surfaces. This not only decreases the specific weight of an airframe but also makes it possible to increase its payload mass and/or fuel endurance, which is critical for military missions.

Thus, the development of unmanned aerial vehicles opens up new horizons for military aviation, although it is accompanied by certain challenges. Continuous improvement of UAV technologies and designs is a key factor in ensuring their effectiveness and safety in modern combat conditions.

There is a known UAV comprising a fuselage, a wing with controls, an engine, and a propeller. Its wing is made according to the "flying wing" aerodynamic scheme with the fuselage located in the nose portion of the UAV in contact with a leading edge of the wing, while the engine with the pushing propeller is located in the tail portion in contact with the trailing edge of the wing.

The fuselage is designed to accommodate the modules having payloads [RU 107126 U1, MPK: V64S 39/10, Publ. 10.08.2011, Bulletin No. 22].

Commonly, launching such a UAV is carried out with the use of a catapult, which makes it inconvenient under combat conditions, in particular on site that is easily visible to the enemy. In addition, the catapult requires additional time to set up and choose a convenient location, and under the condition of conducting combat operations, this procedure can be problematic.

There is a known UAV of an increased maneuverability, which includes a body and an engine. The body is made according to an integral aerodynamic scheme. In the tail portion of the body, there is an engine. In the nose portion of the body, a controlled front vertical tail is installed, and on the surface of the body, there are vertical fins. The body rear surface is configured to have elevrons [RU 2758872 C1, MPK: V64C 39/10, Publ. 02.11.2021, Bulletin No. 31].

The disadvantages of this aerial vehicle are its structural complexity, the availability of the need to use expensive equipment, and its high costs for manufacturing thereof.

There is a known unmanned aerial vehicle for the unmanned aviation complex "Valkyrie", which is made in the form of a body having a center section comprising a payload compartment with a replaceable payload module. The center section is associated with the wing consoles, which are connected to the elevrons and end the aerodynamic surfaces. The UAV is equipped with an electric motor having a propeller installed in the UAV tail portion [https://uk.wikipedia.org/wiki/ACy-1_ « . . . «ВаЛКирия»].

The disadvantages of this UAV are: a need for complex preparatory actions before flight, namely, installing a telescopic mast with antennas, fixing the launch catapult on the ground, transforming the transport containers, therefrom the UAV has been taken out into the operator's workplace, connecting the power supply batteries, flight controller, and many other operations. In other words, the starting launch of such a UAV is provided by the take-off thrust generated by the electric motor installed in the tail portion of the aerial vehicle, namely, the take-off occurs not in a vertical, but in a horizontal direction [UA 126017 U, MPK: B64C 39/10 (2006.01), B64F 1/22 (2006.01), Publ. 25.05.2018, Bulletin No. 10].

There is a known unmanned aerial vehicle, which comprises a fuselage with wings and aerodynamic controls made according to the scheme: rudder, stabilizer, at least one engine with a propeller, and a load, while in this case, it is configured to meet the aerodynamic scheme of "flying wing" type with a fuselage of a rectangular form in plane. The fuselage is made according to the scheme of a "tailless" form with a pushing propeller, as well as with a wing having a small extension of a trapezoidal shape, which is equipped with two fin washers. In this case, the controls have two elevrons, which arrangement determines the location of the center of mass of the aerial vehicle in front of the aerodynamic focus of the wing [UA 99171 A, B64S 13/00, B64D 43/00, G05D 3/00, Publ. 25.07.2012, Bulletin No. 14].

This UAV is not effective enough, and in some events, it is even traumatic, since the launch of such a UAV is performed with a sharp acceleration forward at arm's length using a 2/3 speed of the operating engine, which is fixed in the tail portion, and in essence, pushes the UAV at the start. The fighter must dispose himself to the moment of the launch in an appropriate manner, namely, he has to stand up to full height and make a throwing movement, thereby exposing himself to the danger of being detected or hit. In addition, transporting and carrying the UAV from place to place on the condition of conducting combat operations are extremely inconvenient and difficult.

There is a known UAV made in accordance with the aerodynamic scheme of the "flying wing" type, which comprises a fuselage with wings connected to the aerodynamic controls, namely, the ailerons, and with the end aerodynamic surfaces. The fuselage is equipped with a payload compartment comprising a replaceable payload module installed therein, and the UAV is provided with at least one engine having a propeller, in which the end aerodynamic surfaces are equipped with A-shaped winglets. The UAV is equipped with two electric motors or internal combustion engines provided with propellers. Together with the motors, they are placed on the leading edge of the wings. In addition, the UAV is made collapsible and consists of three parts, namely, the fuselage and two wings connected to each other by quick detachable fasteners [UA 155249 U, B64S 13/00, B64D 43/00, G05D 3/00, Publ. 31.01.2024, Bulletin No. 5].

In addition, known is a UAV whose wing has a deep aerofoil and an increased wing extension. Moreover, its endings are smoothly bent upward; the tail-assembly is made to have a V-shape. Between the wing and the fuselage, there are highly developed transitions, namely, the slicing. The shape of the wing profile and its thickness are selected for the Re number to be corresponding to the speed for the economic mode. Each wing console is combined with an ending that is bent upwards and backwards, and they are given a combined oscillating shape in plane. When viewed from the front, the chord plane of each wing is converted into a set of at least three surfaces, the middle one of which is a plane. The V-shaped tail assembly is equipped with the endings that are deflected backwards [UA 132969 U, B64C 39/02, B64C 3/10, Publ. 25.03.2019, Bulletin No. 6].

The closest analogue of the invention is a multi-purpose unmanned aerial vehicle of the "flying wing" type, which is configured to form a body comprising a center section, wing root portion and wing consoles, a power plant located inside the center section, an air intake device arranged in the center section along the longitudinal axis of the specified center section and, accordingly, the aerial vehicle, a channel for supplying air to the power plant, a channel for removing the pressure flow air from the specified power plant, an equipment compartment made in the front portion of the center section, fuel tanks installed inside the body, a landing gear with a nose rack, and flight control surfaces, while the leading edge of the center section transitions into the leading edge of the wing root portion and then into the leading edge of the wing console, the trailing edge of the center section transitions into the trailing edge of the wing root portion and then into the trailing edge of the wing console, the panels of the center section, the ones of the wing root portions and wing consoles smoothly transition one into the others, the control surfaces provided on the trailing edges of the wing root portions are made in the form of ailerons, which additionally comprises a two-fin vertical tail assembly equipped with a rudder, an elevator located in the rear portion of the center section, end aerodynamic surfaces provided on the endings of the wing consoles, while the power plant is made in the form of an engine with an output shaft and with propeller blades fixed to the above propeller output shaft, which are covered by a cylindrical shell. A protective casing is installed outside the engine output shaft. The additional two-fin vertical tail assembly is installed in the rear portion of the center section while being made with a collapse directed towards the wing consoles. The bases of the fins are parallel to the longitudinal axis of the aerial vehicle. The nose portion of the center section is made oval and has a bend directed towards the wing root portion. The leading edge of the wing root portion is made concave towards the center section, and it is smoothly connected to the leading edge of the center section. The leading edge of the wing console is curved away from the wing root portion, and it is smoothly connected to the above said leading edge of the above said wing root portion. The wing end aerodynamic surfaces are curved upward and backward in the flight direction with a smooth bend towards their trailing edges. The leading edges of the wing end aerodynamic surfaces are smoothly connected to the leading edge of the wing console, the trailing edges of the wing, end aerodynamic surfaces are smoothly connected to the trailing edge of the wing console in the aileron area, the trailing edge of the wing root portion is smoothly connected to the center section behind the aileron, the lateral edge of the center section, which connects the rear portion of the wing root portion with the rear portion of the center section, is made rectilinear and with a smooth transition to the trailing edge of the elevator, the cylindrical shell, which covers the propeller blades, is made with a subsonic aerodynamic profile in the cross section. The air intake device is made in the form of two flat panels installed at an angle to each other, respectively, on the upper and lower surfaces of the center section in its front portion with an angle of inclination towards the longitudinal axis of the aerial vehicle.

The entrance to the air intake device on both sides of the body is made with a smooth connection of the surface of the body with a flat panel of the above specified air intake device. The flat panels of the channel for supplying air to the power plant are installed in the plane of the corresponding flat panels of the air intake device. The specified flat panels of the channel for supplying air to the power plant are joined between each other in the cavity of the channel with formation of a wedge. The lateral walls of the channel for supplying air to the power plant are made flat and arranged parallel to each other in the plane of the vertical axis of the aerial vehicle along the longitudinal axis of the aerial vehicle. The channel for removing air from the power plant is made in the form of two flat panels installed at an angle to each other, respectively, on the upper and lower surfaces of the center section in its rear portion, and while creating the wedge joint, with an angle of inclination towards the longitudinal axis of the aerial vehicle. The tip of this wedge joint is directed towards the wedge formed by the flat panels of the channel for supplying air to the power plant. The outlet from the channel for removing air from the power plant is made with a smooth connection of the flat panels with the surface of the center section. The lateral walls of the channel for removing air from the power plant are made flat and arranged parallel to each other in the plane of the vertical axis of the aerial vehicle along the longitudinal axis thereof with connecting in the same plane with the flat side panels of the channel for supplying air to the power plant. The tip of the wedge formed by the flat panels of the channel for supplying air to the power plant is located at a distance from the tip of the wedge formed by the flat panels of the channel for removing air from the power plant. A cylindrical shell covering the propeller blades is provided in the channel made in the center section to assure the passage of the pressure flow in the gap between the tips of the above-mentioned wedges. The shaft of the power plant electrical motor leaves the tip of the wedge formed by the flat panels of the channel for supplying air to the power plant and enters the tip of the wedge formed by the flat panels of the channel for removing air from the power plant. The free end of the shaft, on which the propeller blades are fixed, rests on a support located inside the wedge formed by the flat panels of the channel for removing air from the power plant. An anti-flutter load is placed directly at the ending of the rudder. Moreover, the ailerons are made to have a trapezoidal form in plane and create converging of the front end portion and the trailing edge directed towards the wing ending. The aileron end ribs are located parallel to the longitudinal axis of the aerial vehicle. The diameter of the cylindrical shell covering the propeller blades is made either equal to the centerline of the center plane, or larger, or smaller than it is. The place of the convergence of the flat panels of the channel for removing air from the power plant is made either pointed into a wedge, or with the formation of a symmetrical or asymmetrical aerodynamic profile, [UA 13409 U, V64S 39/10, Publ. 15.03.2006, Bulletin No. 3].

The disadvantages of the above well-known UAV based on the "flying wing" scheme, which had been chosen as the closest analogue, are the unsatisfactory specified by the maneuverability characteristics, balancing characteristics, and the value of the lift coefficient Cy for a light UAV.

SUMMARY OF THE INVENTION

The present invention is based on the technical problem of creating an unmanned aerial vehicle that would have increased load capacity, wide functionality, be cheap, safe, and efficient and ensure stable operation.

The problem is solved in that in a multi-purpose unmanned aerial vehicle formed according to the aerodynamic scheme of "flying wing" type and comprising a body configured to include a center section, in which a fuselage is formed as a single unit with wing consoles, a wing that smoothly transitions into winglets, and elevrons integrated into the wing, while the unmanned aerial vehicle is equipped with an electric motor having a propeller, power supply batteries and electronics, according to the invention, the wing has an aerodynamic profile being variable in cross-section width and provided with leading and trailing edges, the fuselage is formed to have an S-shaped aerodynamic profile being similar to the wing 1, wherein the aerodynamic profiles of the wing and the fuselage are based on a standardized unified S-shaped wing profile. In this case, the aerodynamic profile of the wing is combined with the aerodynamic profile of the fuselage along its peripheral cross-section, the width of the aerodynamic profile of the wing is gradually reducing by scaling to the value of 0.5 relative to the width of the profile in the transition zone from the fuselage to the wing console, a portion of the fuselage is made oval while gradually wedging and smoothly transitioning into the root portion of the wing console, the leading edge of the wing console is curved laterally from the wing root portion and connected to the leading edge of the wing root portion, the end aerodynamic surfaces of the wing are curved laterally and arranged back along the flight of their trailing edge, and thereby they represent winglets, which are deflected at an angle of 10-15 degrees, the leading edge of the end aerodynamic surface of the wing transitions into the leading edge of the wing console, the trailing edge of the end aerodynamic surface of the wing is connected to the trailing edge of the wing console in the area of the elevron, the trailing edge of the wing root portion is connected to the fuselage behind the elevron, the fuselage trailing edge, which connects the rear portion of the wing root with the rear portion of the center section, is configured to be straight and connected to the trailing edge of the fuselage at the point of transition from the fuselage to the engine group.

The elevrons can be made in the form of a parallelogram and the area of the elevrons is within 0.03 to 0.05 of the total area of the wing.

In the lower portion of the fuselage, there can be provided a box of a streamlined aerodynamic shape with a bracket for the catapult attached thereto for launching therefrom.

In the rear portion of the wing, at the point of the transition from the fuselage to the engine group, there can be made a curved radial cutout, which transitions into a linear one.

The wing can be formed to have the planes parallel to the plane of symmetry for the fuselage and that for the wing with the elevron deviations in the range of the angles +20 degrees up and down.

The wing in plane is made to have a so-called ogive form, and the trailing edge of the wing has a sweep of the wing within 12 to 18 degrees.

In the central portion of the fuselage, there is a box of the frame system for installing the controls and batteries, as well as a box for the payload.

In the rear portion of the fuselage, there is an electric motor, which is protected by a casing for the rear portion of the fuselage, and is connected to the propeller through the output shaft.

In the front portion of the fuselage, there is a module for installing video cameras.

In the front portion of the fuselage, at the point of transition to the wing consoles, there is a battery.

In the wing, at the point of transition to the wing consoles, there is a JPS module.

In the rear portion of the fuselage, there is an electrical module, an initiation board, and an airspeed sensor.

In the front portion of the wing, at the point of transition from the fuselage to the wing, there is a Pitot tube.

In the right and left wings, respectively, at the point of transition to the wing endings, there are video transmitters.

The wing profiles are made variable, analytically to the equation of the form:

$$y = \sum_{n=1}^{7} a_n x^{n-\frac{1}{2}}$$

That can also be written in the form of:
$y = a_1 x^{0.5} + a_2 x^{1.5} + a_3 x^{2.5} + a_4 x^{3.5} + a_5 x^{4.5} + a_6 x^{5.5} + a_7 x^{6.5}$, At the same time, the coefficients a1 ... a7 were used for the upper and lower edges of the profile.

Owing to the implemented design solutions, it has become possible to reduce the aerial vehicle wingspan, while to increase its load capacity and speed, as well as its flight range.

Installed electrical equipment, such as video cameras, video transmitters and JPS sensors, help provide the operator control at a safer distance.

In this UAV design, the wing chord is increased, which, in turn, allows the users to increase the centering range, as well as enlarge the total wing area up to 65dm$^2$. With an increase in the wing area, it is possible to reduce the wingspan to 1500 mm, while maintaining flight characteristics, such as lift, where the maximum weight is 8.5 kg and the maximum speed is 300 km/h, structural rigidity, and to lower the volume for transportation of 0.5 m$^3$ (the UAV in a box for transportation). Similar UAV designs have larger dimensions at similar flight characteristics.

The design of the elevrons in the form of a parallelogram and with the elevrons area within 0.03 to 0.05 of the total wing area provided for increasing the flight characteristics, such as lift, and improving the roll control.

The implementation in the lower, central and rear portions of the fuselage of a frame box having a streamlined aerodynamic shape for arranging the controls, batteries and a box for the payload, as well as a bracket for launching from a catapult and a casing for the electric motor through the output shaft connected to the propeller, as well as the arrangement of a module for installing video cameras in the front portion of the fuselage, the location of the battery closer to the wing, and also the placement of the electrical module for the initiation plane (board) and air speed sensor in the rear portion of the fuselage, the installation of the JPS module, Pitot tube and video transmitters in different portions of the wing have allowed to make more sense in arranging the equipment for providing better centering of the UAV.

The implementation of a curved radius cutout transitioning into a linear cutout in the rear portion of the wing at the point of the transition from the fuselage to the motor group reduces the area of the rear portion of the wing and makes it possible to lower the load on the rear portion of the wing and thus decrease resistance.

The design of the wing with the planes parallel to the plane of symmetry for the fuselage and with the deflection of the elevrons within the range of the angles of +20 degrees up and down make it possible to increase the flight characteristics, such as lift and roll control.

The design of the wing in a so-called ogive form and the trailing edge of the wing with a sweep within 12 to 18 degrees allowed increasing the aerodynamic quality "K" (the coefficients are given in Table 6), as compared to a triangular wing.

BRIEF DESCRIPTION OF THE DRAWINGS

The proposed technical solution is explained by the drawings and diagrams, where.

DETAILED DESCRIPTION OF THE INVENTION

Figure 1:
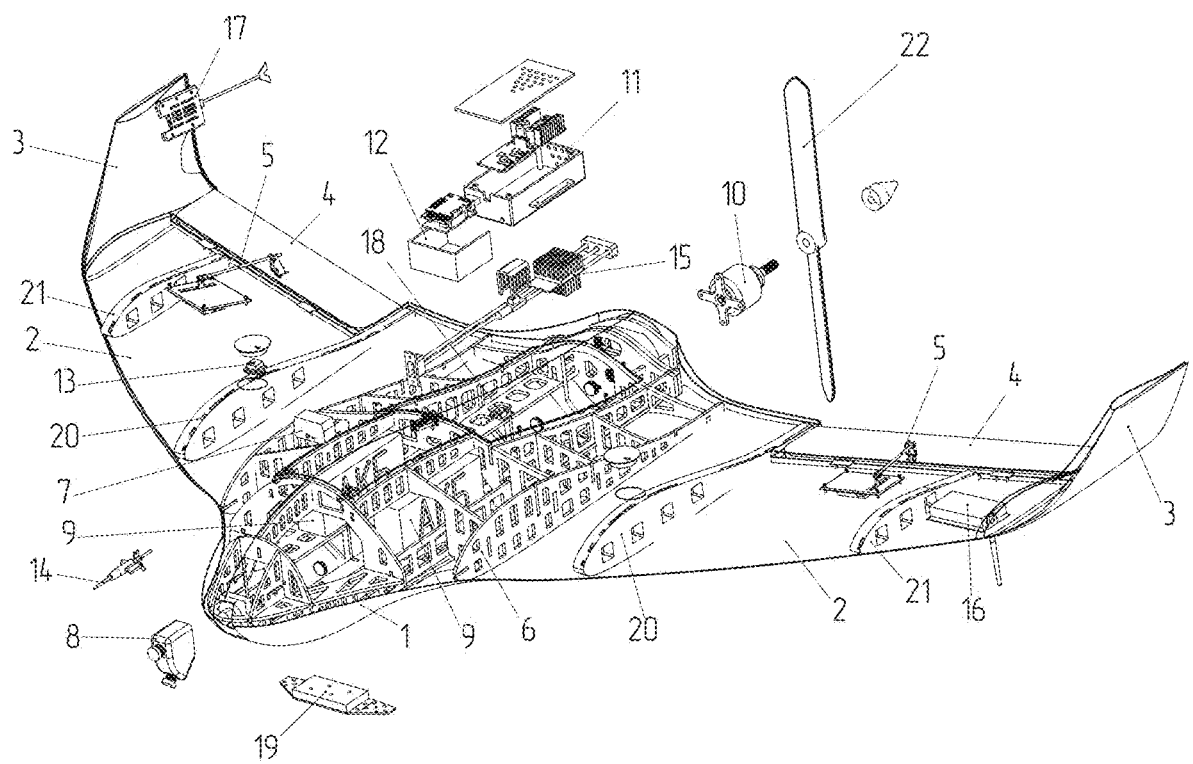
FIG. 1 shows a design and layout diagram of a multi-purpose unmanned aerial vehicle of the "flying wing" type, a perspective view showing the arrangement of the equipment inside the body (fuselage) (as one of the design embodiments)

Designations on the Drawings 1-fuselage;
2-wing;
3-winglet;
4-elevron;
5-servo unit;
6-frame;
7-initiation board;
8-video camera module;
9-batteries (AKB);
10-electric motor;
11-electrical module No. 1;
12-electrical module No. 2;
13-GPS module;
14-Pitot tube;
15-electrical motor speed controller;
16-video transmitter #1;
17-video transmitter #2;
18-air speed sensor;
19-catapult launch bracket;
20-spar;
21-rib #1;
22-rib #2;
23-propeller;
24-catapult.

A multi-purpose unmanned aerial vehicle, which is made according to the aerodynamic scheme of "flying wing" type, comprises a body (fuselage) formed to have a center section, in which fuselage 1 is made as a single unit with the wing consoles, wing 2, which smoothly transitions into winglets 3, and elevrons 4 integrated into the wing. The unmanned aerial vehicle is equipped by electric motor 10 with propeller 23, power supply batteries of AKB 9 (AKB 9), video cameras 8 and electronics.

The aerodynamic profiles of wing 2 and fuselage 1 are based on a standardized unified S-shaped wing profile 2.2, while the width of the aerodynamic profile of wing 2 monotonically decreases by scaling to the value of 0.5 relative to the width of the profile in the transition zone from fuselage 1 to the wing console. Wing 2 has aerodynamic profile 2.2 being variable in the cross-section width. It is made to have leading and trailing edges and to connect to the aerodynamic profile of fuselage 1 along its peripheral cross-section. Fuselage 1 has an aerodynamic profile of an S-shaped form being similar to the wing 1, which is scaled with a factor of 2 to 2.6, while the nose portion of fuselage 1 is made oval with gradually wedging and a smoothly transitioning in the direction of the root portion of wing console 2. The leading edge of the wing console is curved laterally from the root portion of the wing. It is smoothly connected to the leading edge of the root portion of the wing. The end aerodynamic surfaces of the wing are curved upwards relative to the horizon and back in the flight direction at smoothly bending towards their trailing edges. In this case, they are evaluable as winglets 3, which are deflected at an angle of 10 to 15 degrees. The leading edge of the wing end aerodynamic surfaces is smoothly connected to the leading edge of the wing console. The trailing edge of the wing end aerodynamic surfaces is smoothly connected to the trailing edge of the wing console in the area of the elevron, the trailing edge of wing root portion 2 is smoothly connected to fuselage 1 and elevron 3. The lateral edge of fuselage 1, which connects the rear portion of wing root portion 2 with the rear portion of the center section, is made straight with a smooth transition to the trailing edge of the fuselage up to the point of transition from fuselage 1 to the engine group comprising electric motor 10.

Elevrons 4 are made to have a shape of a parallelogram, and the area of the elevrons is provided within 0.03 to 0.06 of the total area of wing 2.

In fuselage 1, namely, in the lower portion thereof, a box of a streamlined aerodynamic shape is made, to which there is attached bracket 19 to provide for launching from the catapult.

Wing 2 is made to have planes parallel to the plane of symmetry of fuselage 1.

In this case, the deviation of elevrons 4 in the range of angles ±20 degrees up and down, also wing 2 in plane can be made to have a so-called ogive form, and the trailing edge of the wing has a sweep in the range of 12 to 18 degrees.

In wing 2 closer to the wing consoles, there is JPS module 13.

In right and left wings 2, closer to the wing endings, video transmitters 16 and 17 are installed.

In the rear portion of wing 2, at the point of transition from fuselage 1 to the engine group, there is provided a curved radial cutout transitioning into a linear one.

In the central portion of fuselage 1, there is box 6 of the frame system for installing controls 11 and 12, and batteries 9, as well as a box for the payload, which can be located in the front portion of fuselage 1.

In the rear portion of fuselage 1, there is an electric motor 10, which is protected by a casing for the rear portion of the fuselage. Electric motor 10 is connected to propeller 23 through the output shaft, and also in the rear portion of fuselage 1, there are electrical modules 11 and 12, initiation plane (board) 7 and air speed sensor 18.

In the front portion of fuselage 1, there is module 8 for installing video cameras, closer to wing consoles 2, battery 9 is located, and in the front portion of wing 2, at the point of fuselage 1 transition to wing 2, Pitot tube 14 is installed.

A multi-purpose unmanned aerial vehicle functions as follows.

The UAV is transported packed in containers to its destination place. After unpacking the UAV, its operation is performed as follows.

Catapult 24 is assembled and installed being oriented so that the UAV would be launched upwind. Before launching catapult 24, the integrity of the structure is checked paying special attention to the elastic elements and the carriage. The carriage wheels are made sure to rotate freely. The battery charge and the integrity of the wiring for the tension and descent systems are checked as well. After mechanically assembling, the battery of the power system is then connected.

The UAV is installed on catapult 24 only in the starting (rear) position of the carriage. Before this, the catapult must be put on the safety catch. Catapult 24 is put off the safety catch only at the last moment before the UAV would be launched.

There is installed an antenna complex, which consists of two antennas, namely, a directional antenna for receiving the mast video signal, a video receiver, and a battery, and also an antenna for transmitting the control signal on its stand with a modem and a battery. Both antennas are placed at a distance of at least 30 m from the starting position and from each other to ensure electromagnetic compatibility.

The take-off procedure is performed after the pre-flight check has been completed successfully. The UAV is to have been installed on catapult 24, the flight controller switched over to the modes of TAKEOFF, ARMED, the throttle handle arranged near the central position (throttle ~ 50%), catapult 24 put off the safety catch, the crew members left the starting position and are in the cover.

The descent of catapult 24 occurs by an electric remote method at a safe distance from the operator. After the UAV has been separated from the catapult, the engine automatically starts, and the UAV entries into climb (goes into the UAV ascension mode). Upon reaching the height of 100 m, a pilot could take control in manual mode on having put off the TAKEOFF mode, or the UAV would follow the course in a pre-planned mission on the automatic mode with the use of the GPS sensors.

The ascension and further piloting can be carried out in manual mode or in AUTO mode.

The movement direction is controlled using either a video camera unit, or a night vision camera.

An important stage of the UAV flight is a stage of landing (regular or emergency). Both regular and emergency landings are carried out either "by the plane" on the "belly" of the device or using a parachute.

An example of determining the optimal aerodynamic characteristics of the UAV profile.

For the analysis, the determination of the aerodynamic characteristics in the CFD package, which solves the Navier-Stokes equation, has been used. This made it possible to evaluate the characteristics near the stall and to carry out the static thrust tests of the power plant and specify the model of the electric motor.

At the same time, an analysis of the fuselage change has been carried out since an extended nose portion had been added. Because of the fact that the fuselage has been included into the procedure for providing the determination of the area and the average aerodynamic chord of the wing, this caused a change in the coefficients for the lift and for the moment and required the refinements of the alignments. The change of the wing profile to a wing profile with a sharper nose has been taken into account. This gave an opportunity to improve the speed characteristics and change the stall performances. This also required confirmation and refinement of the characteristics obtained through flight tests of the complex.

Figure 2:
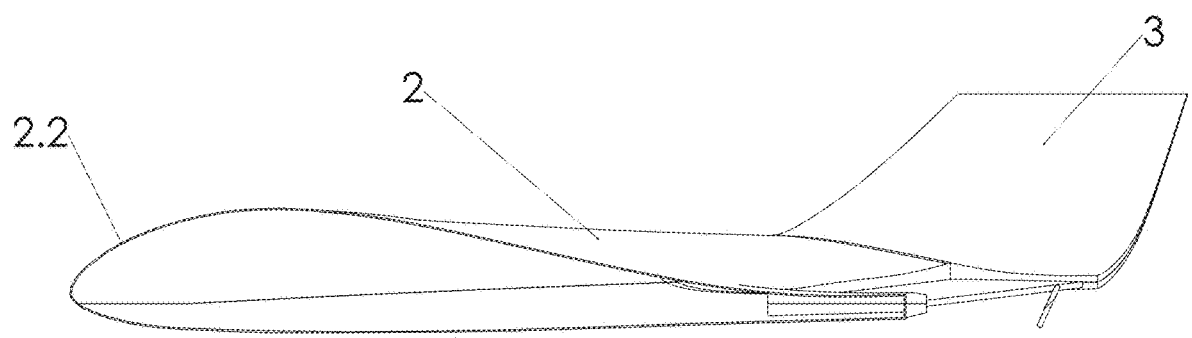
FIG. 2 is a cross-section of the selected S-shaped wing profile.

The basis for determining the geometric characteristics has become a model in the 3dm format of the Rhinoceros program (FIG. 1) having a wingspan of about 1500 mm. For the discretization, the planes crossed the model into 20 sections (FIG. 2). The obtained chord values, as well as the coordinates of their nose portion and twist values are given in Table 1.

TABLE 1

Geometric characteristics of the used model

| $Z, _{MM}$ | $X, _{MM}$ | $Y, _{MM}$ | $C, _{MM}$ | Phi, ° | $X2, _{MM}$ |
|---|---|---|---|---|---|
| 0.00 | 0.00 | 0.00 | 764.76 | 0.99 | 764.76 |
| 37.03 | 20.23 | 0.37 | 744.53 | 0.96 | 764.76 |
| 68.35 | 71.90 | 0.06 | 684.43 | 0.54 | 756.33 |
| 92.67 | 120.27 | 0.23 | 620.46 | 0.58 | 740.73 |
| 115.87 | 155.22 | 0.05 | 574.06 | 0.73 | 729.28 |

TABLE 1-continued

Geometric characteristics of the used model

| Z, $_{MM}$ | X, $_{MM}$ | Y, $_{MM}$ | C, $_{MM}$ | Phi, ° | X2, $_{MM}$ |
|---|---|---|---|---|---|
| 143.27 | 186.40 | 0.02 | 532.95 | 0.93 | 719.36 |
| 175.27 | 213.60 | 0.14 | 498.32 | 1.08 | 711.92 |
| 218.84 | 236.51 | 0.74 | 473.60 | 1.12 | 710.11 |
| 262.80 | 261.15 | 1.43 | 452.72 | 1.17 | 713.87 |
| 306.76 | 287.15 | 2.26 | 434.20 | 1.21 | 721.35 |
| 399.52 | 346.78 | 4.42 | 399.25 | 1.24 | 746.03 |
| 492.28 | 416.90 | 6.05 | 352.80 | 1.19 | 769.69 |
| 585.04 | 496.04 | 7.22 | 299.67 | 1.11 | 795.71 |
| 672.19 | 574.39 | 8.83 | 247.14 | 1.14 | 821.53 |
| 687.59 | 591.11 | 12.04 | 236.01 | 1.00 | 827.12 |
| 700.72 | 609.20 | 17.66 | 223.58 | 0.83 | 832.78 |
| 711.79 | 627.87 | 25.56 | 210.48 | 0.60 | 838.35 |
| 720.93 | 646.42 | 35.86 | 197.56 | 0.41 | 843.98 |
| 727.30 | 664.41 | 48.92 | 184.98 | 0.25 | 849.40 |
| 741.71 | 734.35 | 113.85 | 135.95 | 0.00 | 870.30 |

Since the fuselage is included into the supporting surface, the modification of the contour caused changes in the characteristic values of the wing area and the average aerodynamic chord of the wing, to which the aerodynamic coefficients are reduced:

According to Table 1 data, the characteristic area, the average aerodynamic chord length, and its position were determined by the corresponding formulas:

$$s = 2\left|\int_0^{l/2} b \cdot dz\right.$$

$$x_A = 2\int_0^{l/2} bx \cdot dz$$

$$b_A = \frac{2}{S}\int_0^{l/2} b^2 \cdot dz$$

$$z_A = \frac{2}{S}\int_0^{l/2} bz \cdot dz$$

The obtained values are given in Table 2.

TABLE 2

| Parameter | Value, $_M$ |
|---|---|
| Area | 0.6298 |
| Average aerodynamic chord of a wing (WAAC) | 0.4763 |
| WAAC nose along X | 0.2750 |
| WAAC nose along Z | 0.2981 |
| Wingspan | 1.4834 |

Subsequently, all the aerodynamic coefficients have been reduced to these values.

When determining the wing profile, the following changes were included:
 The nose portion of the profile acquired a smaller radius;
 The relative curvature of the profile centerline has been increased;
 The relative thickness of the profile has been increased and pulled back;
 The S-shape (reverse curvature of the centerline) has been decreased.

This significantly affected the aerodynamic characteristics of the UAV, when determining which the fuselage-wing-winglet surface was divided into 20 profiles (positions of sections are according to Table 1), each of which has been scaled to a single chord (i.e., the X coordinate of any point on the profile changes from 0 to 1). The points had been written from the contour using MATLAB Curve Fitting Toolbox, converted into the coefficients of the following equation, separately for the upper and lower braces:

$$y = \sum_{n=1}^{7} a_n x^{n-\frac{1}{2}}$$

The equation can be derived from the sum sign and written in one line as follows:
 $y = a_1 x^{0.5} + a_2 x^{1.5} + a_3 x^{2.5} + a_4 x^{3.5} + a_5 x^{4.5} + a_6 x^{5.5} + a_7 x^{6.5}$ Accordingly, for each section we will have seven (7) coefficients describing the upper braces and seven ones (7) describing the lower one, which are summarized in Table 3 and Table 4.

TABLE 3

The coefficients of the upper braces of the wing profile

| Name | Z, $_{MM}$ | $a_1$ | $a_2$ | $a_3$ | $a_4$ | $a_5$ | $a_6$ | $a_7$ |
|---|---|---|---|---|---|---|---|---|
| W1 | 0 | 0.2188 | 1.8326 | −11.8822 | 29.9683 | −39.7636 | 27.2515 | −7.5585 |
| W2 | 37.028 | 0.2255 | 1.6723 | −11.5800 | 31.0212 | −43.8406 | 31.7325 | −9.1764 |
| W3 | 68.346 | 0.2190 | 1.6148 | −11.4942 | 31.6254 | −46.3982 | 34.8959 | −10.4369 |
| W4 | 92.666 | 0.2218 | 1.5537 | −11.4540 | 31.8422 | −46.8631 | 35.2087 | −10.4901 |
| W5 | 115.874 | 0.2054 | 1.6829 | −12.3968 | 35.1182 | −52.4316 | 39.7295 | −11.8927 |
| W6 | 143.274 | 0.2034 | 1.4426 | −10.7487 | 30.1269 | −44.5867 | 33.5092 | −9.9325 |
| W7 | 175.265 | 0.2021 | 0.9496 | −6.8247 | 17.1752 | −23.5603 | 16.9559 | −4.8859 |
| W8 | 218.841 | 0.1987 | 1.0195 | −7.4059 | 19.2797 | −27.0805 | 19.7471 | −5.7465 |
| W9 | 262.801 | 0.1966 | 1.0508 | −7.6928 | 20.2897 | −28.9015 | 21.3914 | −6.3232 |
| W10 | 306.76 | 0.1940 | 1.0376 | −7.5802 | 19.8045 | −27.9731 | 20.6238 | −6.0967 |
| W11 | 399.52 | 0.1934 | 0.7423 | −5.2597 | 11.7975 | −14.4812 | 9.8493 | −2.8347 |
| W12 | 492.279 | 0.1867 | 0.7189 | −4.9433 | 10.7340 | −12.6833 | 8.3033 | −2.3090 |
| W13 | 585.038 | 0.1877 | 0.7108 | −5.1568 | 11.8758 | −14.8470 | 10.0768 | −2.8390 |
| W14 | 672.188 | 0.1875 | 0.6764 | −5.3263 | 12.0270 | −13.7426 | 8.2888 | −2.1028 |
| W15 | 687.594 | 0.2129 | 0.4286 | −4.8005 | 11.9341 | −14.5558 | 9.1240 | −2.3311 |
| W16 | 700.717 | 0.2033 | 0.5600 | −5.6807 | 14.7544 | −19.0963 | 12.6963 | −3.4244 |
| W17 | 711.785 | 0.1807 | 0.7078 | −5.9432 | 14.7434 | −18.6159 | 12.2233 | −3.2832 |
| W18 | 720.926 | 0.1569 | 0.9803 | −7.2901 | 18.5728 | −24.6066 | 16.9127 | −4.7125 |
| W19 | 727.295 | 0.1768 | 0.9759 | −8.5858 | 24.7639 | −36.1533 | 26.5959 | −7.7591 |
| W20 | 741.711 | 0.2361 | 0.4236 | −5.7461 | 16.9940 | −24.7867 | 18.1935 | −5.2962 |

It should be noted that the first sections describe the geometry of the fuselage, which (particularly on the lower surface) due to the need to fit batteries, payload, power plant, etc. has significant deviations from a smooth aerodynamic contour and cannot be described by this equation with sufficient accuracy, i.e. the value of the approximation reliability is slightly below 0.9999. This applies to the first five (5) sections. Next comes the wing surface, which is described adequately.

TABLE 4

Coefficients of the upper braces of the wing profile

| Name | $Z, _{MM}$ | $a_1$ | $a_2$ | $a_3$ | $a_4$ | $a_5$ | $a_6$ | $a_7$ |
|---|---|---|---|---|---|---|---|---|
| W1  | 0       | −0.2150 | −0.9170 | 9.3044  | −29.9695 | 46.7030 | −35.5956 | 10.6255 |
| W2  | 37.028  | −0.2431 | −0.7018 | 7.8846  | −24.5016 | 36.2372 | −26.2417 | 7.5147  |
| W3  | 68.346  | −0.2259 | −0.3712 | 4.9959  | −15.2919 | 22.3979 | −16.1965 | 4.6668  |
| W4  | 92.666  | −0.2167 | 0.1847  | 1.4478  | −5.5097  | 8.6777  | −6.6605  | 2.0586  |
| W5  | 115.874 | −0.1790 | 0.0831  | 1.6038  | −5.5038  | 8.3144  | −6.2003  | 1.8658  |
| W6  | 143.274 | −0.1588 | 0.1259  | 1.0255  | −3.3204  | 4.4037  | −2.8541  | 0.7641  |
| W7  | 175.265 | −0.1500 | 0.2501  | 0.5223  | −3.0268  | 5.3424  | −4.1995  | 1.2494  |
| W8  | 218.841 | −0.1495 | 0.3209  | −0.1060 | −0.9341  | 2.0054  | −1.6248  | 0.4757  |
| W9  | 262.801 | −0.1484 | 0.3223  | −0.1183 | −0.8944  | 1.9454  | −1.5813  | 0.4636  |
| W10 | 306.76  | −0.1462 | 0.3218  | −0.1287 | −0.8610  | 1.9003  | −1.5528  | 0.4566  |
| W11 | 399.52  | −0.1383 | 0.3128  | −0.1557 | −0.7190  | 1.6696  | −1.4009  | 0.4243  |
| W12 | 492.279 | −0.1339 | 0.3009  | −0.1535 | −0.6618  | 1.5272  | −1.2616  | 0.3750  |
| W13 | 585.038 | −0.1344 | 0.2967  | −0.1246 | −0.7622  | 1.6851  | −1.3719  | 0.4024  |
| W14 | 672.188 | −0.1341 | 0.2607  | 0.1984  | −1.8881  | 3.5650  | −2.8689  | 0.8587  |
| W15 | 687.594 | −0.1383 | 0.2673  | 0.1034  | −1.4587  | 2.7575  | −2.1988  | 0.6555  |
| W16 | 700.717 | −0.1359 | 0.2531  | 0.1772  | −1.6956  | 3.1444  | −2.5043  | 0.7484  |
| W17 | 711.785 | −0.1323 | 0.2431  | 0.2090  | −1.8062  | 3.3457  | −2.6754  | 0.8031  |
| W18 | 720.926 | −0.1319 | 0.2696  | 0.0374  | −1.3574  | 2.7475  | −2.2774  | 0.6984  |
| W19 | 727.295 | −0.1352 | 0.2530  | 0.1702  | −1.7227  | 3.2488  | −2.6198  | 0.7910  |
| W20 | 741.711 | −0.1530 | 0.2982  | −0.0020 | −1.2016  | 2.4108  | −1.9656  | 0.5943  |

A similar nature of the deviations is also present on the winglet surface (the last five (5) sections). That is, the surface described by this equation and these coefficients is mathematically smooth, has aerodynamic shapes, but in the specified zones it deviates somewhat from the real surface of the UAV.

The determination of aerodynamic characteristics has been performed in several programs-ANSYS Fluent, XFLR5, and PANSYM. Each program is used to evaluate various phenomena that together determine the aerodynamic characteristics of the UAV. The ANSYS mainly is for evaluating the phenomena of flow separation and the UAV behavior at low speeds, the XFLR5 is for evaluating the phenomena of changing the drag depending on a flight speed value, the PANSYM is for evaluating balancing and the range of centering.

Figure 5:
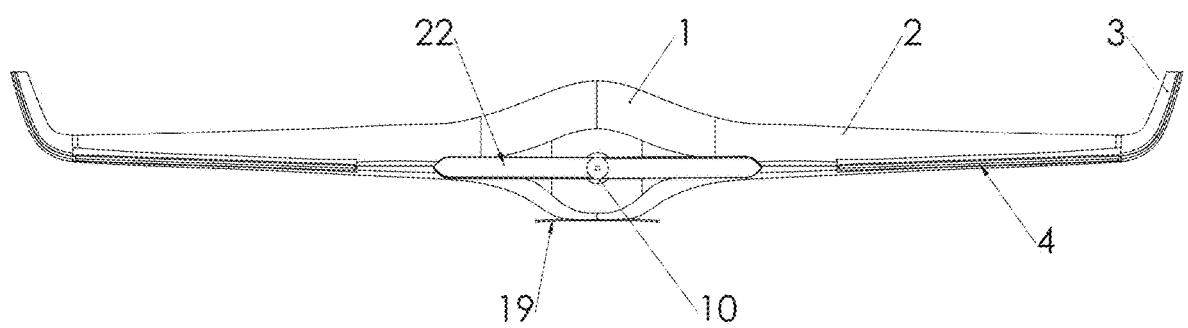
FIG. 5 is a design and layout diagram of a multi-purpose unmanned aerial vehicle of the "flying wing" type in the rear view.
Figure 6:
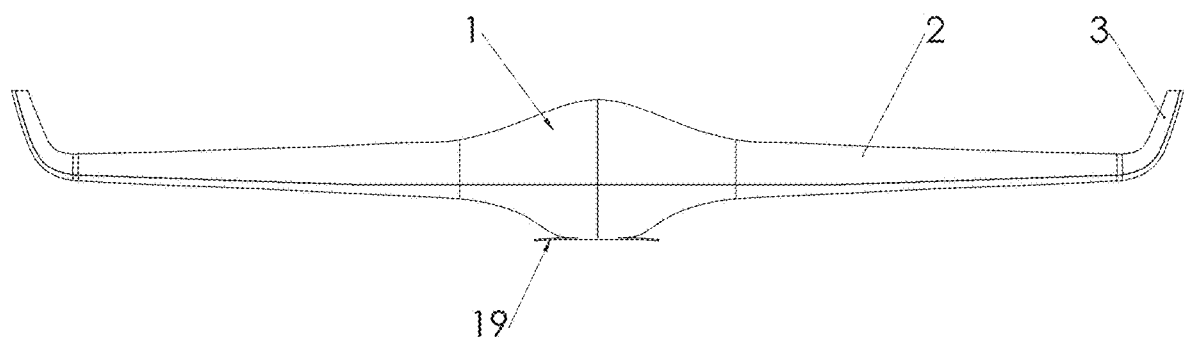
FIG. 6 is a design and layout diagram of a multi-purpose unmanned aerial vehicle of the "flying wing" type, front view.
Figure 7:
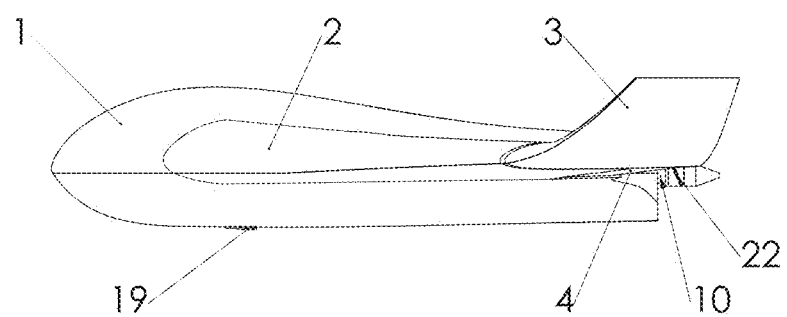
FIG. 7 shows a design and layout diagram of a multi-purpose unmanned aerial vehicle of the "flying wing" type, side view.
Figure 8:
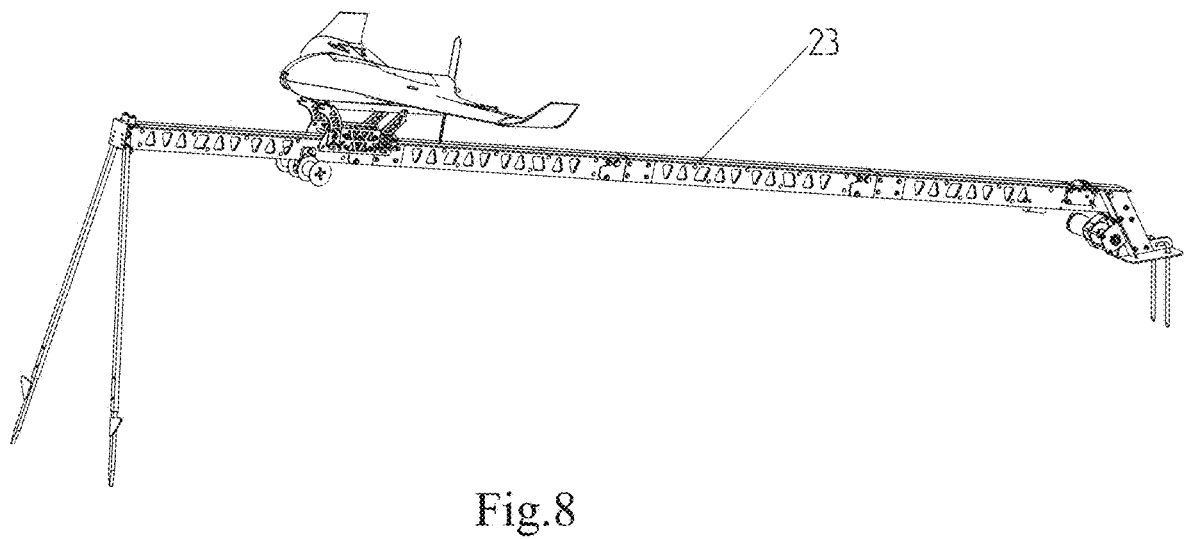
FIG. 8 is a design and layout diagram of a multi-purpose unmanned aerial vehicle of the "flying wing" type on the installed catapult.
Figure 9:
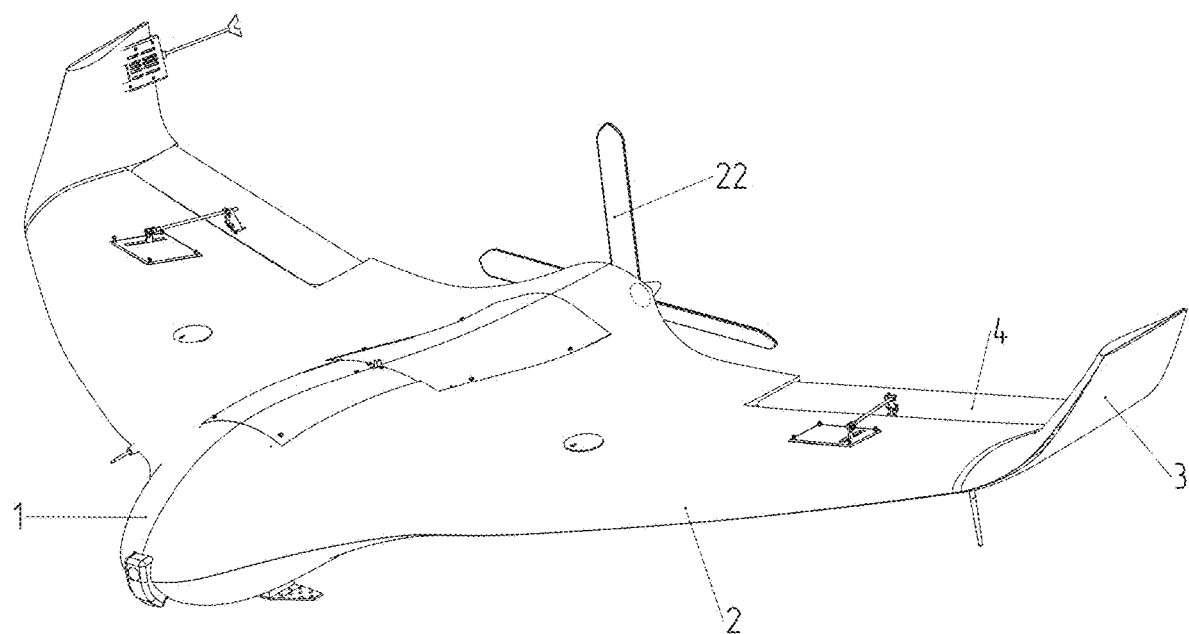
FIG. 9 is a design and layout diagram of a multi-purpose unmanned aerial vehicle of the "flying wing" type, appearance of the resulting 3D model.
Figure 10:
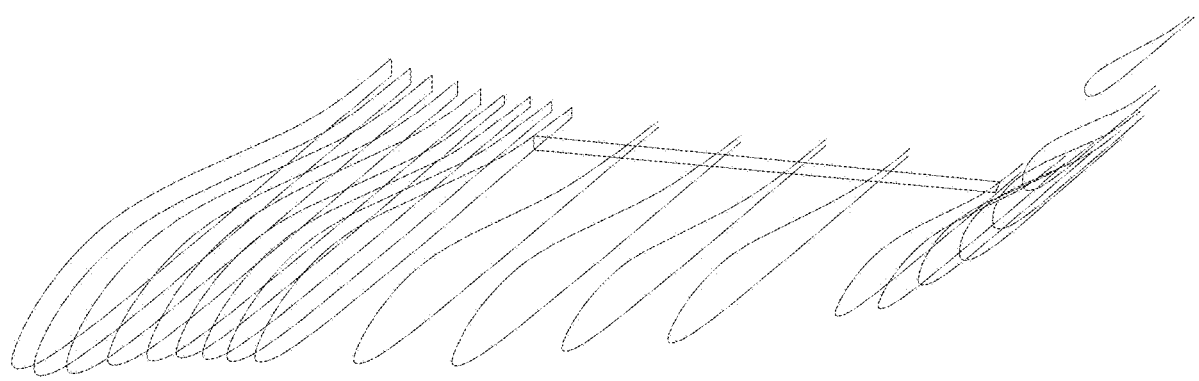
FIG. 10 is a design and layout diagram of a multi-purpose unmanned aerial vehicle of the "flying wing" type, location of the calculated sections.
Figure 11:
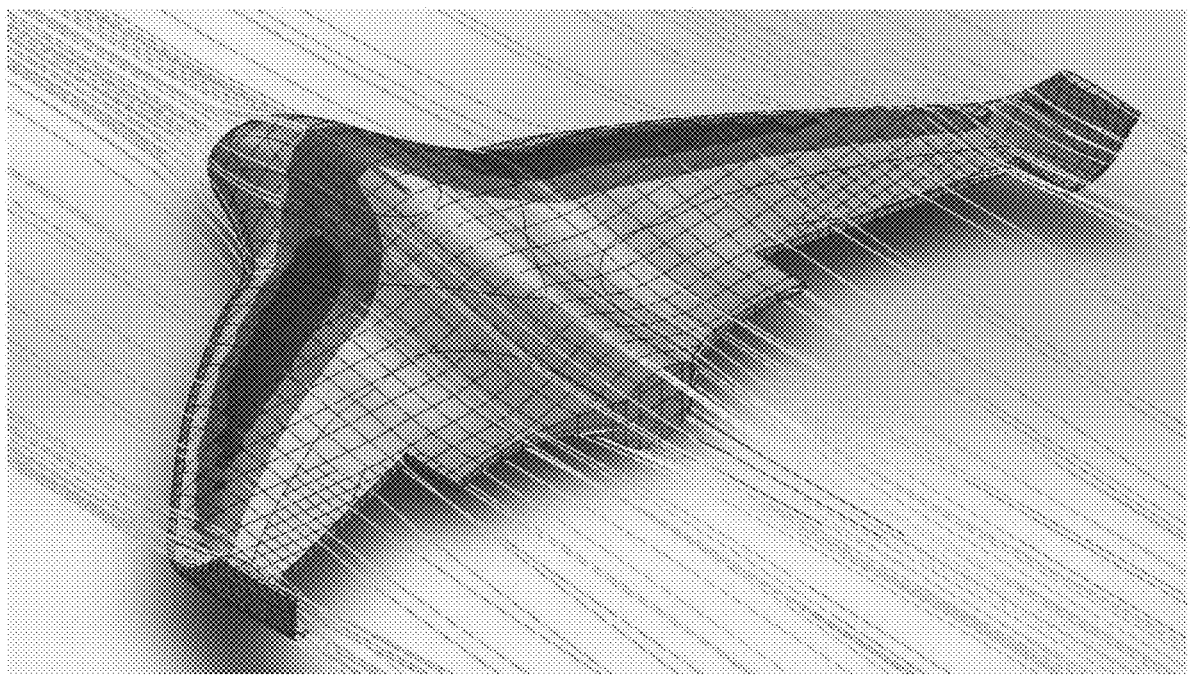
FIG. 11 is a design and layout diagram of a multi-purpose unmanned aerial vehicle of the "flying wing" type, calculation model of the UAV in the XFLR5 program.

When the flight speed changes, the drag changes due to a change in the Reynolds number, therefore, the program took into account the polars for different flight speeds in the range of 10 . . . 50 m/s., FIG. 5 . . . 7. The numerical values are given in Tables 5, 6, and 7.

At the speed values of above 50 m/s, it was assumed that the drag no longer changes since the self-similarity regime has been reached (the Reynolds number has a minimal effect).

TABLE 5

Friction resistance coefficients according to XFLR5 data for different flight speeds CL

| | CD | | | | | |
|---|---|---|---|---|---|---|
| CL | V = 10 $_{M/C}$ | V = 15 $_{M/C}$ | V = 20 $_{M/C}$ | V = 30 $_{M/C}$ | V = 40 $_{M/C}$ | V = 50 $_{M/C}$ |
| 0.00 | 0.0181 | 0.0165 | 0.0159 | 0.0151 | 0.0151 | 0.0144 |
| 0.05 | 0.0180 | 0.0165 | 0.0159 | 0.0152 | 0.0152 | 0.0145 |
| 0.10 | 0.0186 | 0.0170 | 0.0163 | 0.0157 | 0.0157 | 0.0150 |
| 0.15 | 0.0196 | 0.0179 | 0.0172 | 0.0165 | 0.0165 | 0.0158 |
| 0.20 | 0.0212 | 0.0193 | 0.0185 | 0.0178 | 0.0178 | 0.0171 |
| 0.25 | 0.0232 | 0.0212 | 0.0203 | 0.0195 | 0.0195 | 0.0187 |
| 0.30 | 0.0256 | 0.0235 | 0.0226 | 0.0217 | 0.0217 | 0.0209 |
| 0.35 | 0.0284 | 0.0262 | 0.0252 | 0.0242 | 0.0242 | 0.0234 |
| 0.40 | 0.0317 | 0.0293 | 0.0282 | 0.0272 | 0.0272 | 0.0264 |
| 0.45 | 0.0353 | 0.0328 | 0.0317 | 0.0306 | 0.0306 | 0.0297 |
| 0.50 | 0.0393 | 0.0367 | 0.0355 | 0.0343 | 0.0343 | 0.0334 |
| 0.55 | 0.0437 | 0.0410 | 0.0397 | 0.0384 | 0.0384 | 0.0376 |
| 0.60 | 0.0484 | 0.0456 | 0.0442 | 0.0429 | 0.0429 | 0.0420 |
| 0.65 | 0.0534 | 0.0505 | 0.0491 | 0.0478 | 0.0478 | 0.0469 |
| 0.70 | 0.0587 | 0.0558 | 0.0543 | 0.0530 | 0.0530 | 0.0523 |
| 0.75 | 0.0643 | 0.0614 | 0.0599 | 0.0586 | 0.0586 | 0.0582 |
| 0.80 | 0.0702 | 0.0673 | 0.0658 | 0.0647 | 0.0647 | 0.0644 |
| 0.85 | 0.0764 | 0.0735 | 0.0722 | 0.0714 | 0.0714 | 0.0707 |
| 0.90 | 0.0828 | 0.0799 | 0.0788 | 0.0782 | 0.0782 | 0.0773 |
| 0.95 | 0.0891 | 0.0863 | 0.0854 | 0.0851 | 0.0851 | 0.0839 |
| 1.00 | 0.0955 | 0.0927 | 0.0919 | 0.0919 | 0.0919 | 0.0905 |

TABLE 5-continued

Friction resistance coefficients according to XFLR5 data for different flight speeds CL

| | CD | | | | | |
|---|---|---|---|---|---|---|
| CL | V = 10 M/C | V = 15 M/C | V = 20 M/C | V = 30 M/C | V = 40 M/C | V = 50 M/C |
| 1.05 | 0.1018 | 0.0990 | 0.0985 | 0.0987 | 0.0987 | 0.0972 |
| 1.10 | 0.1082 | 0.1054 | 0.1051 | 0.1055 | 0.1055 | 0.1038 |

TABLE 6

Aerodynamic quality coefficients according to XFLR5 data for different flight speeds

| | CD | | | | | |
|---|---|---|---|---|---|---|
| CL | V = 10 M/C | V = 15 M/C | V = 20 M/C | V = 30 M/C | V = 40 M/C | V = 50 M/C |
| 0.00 | 0.00 | 0.00 | 0.00 | 0.00 | 0.00 | 0.00 |
| 0.05 | 2.78 | 3.04 | 3.15 | 3.29 | 3.29 | 3.45 |
| 0.10 | 5.38 | 5.90 | 6.12 | 6.38 | 6.38 | 6.68 |
| 0.15 | 7.64 | 8.39 | 8.73 | 9.07 | 9.07 | 9.47 |
| 0.20 | 9.45 | 10.36 | 10.79 | 11.22 | 11.22 | 11.72 |
| 0.25 | 10.79 | 11.81 | 12.29 | 12.81 | 12.81 | 13.34 |
| 0.30 | 11.73 | 12.79 | 13.29 | 13.85 | 13.85 | 14.36 |
| 0.35 | 12.32 | 13.37 | 13.89 | 14.45 | 14.45 | 14.94 |
| 0.40 | 12.64 | 13.65 | 14.16 | 14.71 | 14.71 | 15.17 |
| 0.45 | 12.75 | 13.72 | 14.21 | 14.73 | 14.73 | 15.14 |
| 0.50 | 12.72 | 13.62 | 14.09 | 14.58 | 14.58 | 14.95 |
| 0.55 | 12.59 | 13.42 | 13.86 | 14.31 | 14.31 | 14.64 |
| 0.60 | 12.40 | 13.16 | 13.57 | 13.98 | 13.98 | 14.27 |
| 0.65 | 12.17 | 12.86 | 13.24 | 13.61 | 13.61 | 13.86 |
| 0.70 | 11.92 | 12.54 | 12.88 | 13.21 | 13.21 | 13.39 |
| 0.75 | 11.66 | 12.22 | 12.53 | 12.80 | 12.80 | 12.88 |
| 0.80 | 11.39 | 11.89 | 12.15 | 12.36 | 12.36 | 12.43 |
| 0.85 | 11.12 | 11.56 | 11.77 | 11.90 | 11.90 | 12.02 |
| 0.90 | 10.87 | 11.27 | 11.42 | 11.50 | 11.50 | 11.64 |
| 0.95 | 10.66 | 11.01 | 11.13 | 11.17 | 11.17 | 11.32 |
| 1.00 | 10.47 | 10.79 | 10.88 | 10.88 | 10.88 | 11.04 |
| 1.05 | 10.31 | 10.60 | 10.66 | 10.64 | 10.64 | 10.81 |
| 1.10 | 10.17 | 10.43 | 10.47 | 10.42 | 10.42 | 10.60 |

TABLE 7

Coefficients of lift and pitching moment by angle of attack

| AoA | CL | Cm |
|---|---|---|
| −5 | −0.269 | 0.266 |
| −4.5 | −0.239 | 0.240 |
| −4 | −0.209 | 0.214 |
| −3.5 | −0.179 | 0.187 |
| −3 | −0.149 | 0.161 |
| −2.5 | −0.119 | 0.134 |
| −2 | −0.089 | 0.108 |
| −1.5 | −0.060 | 0.081 |
| −1 | −0.030 | 0.055 |
| −0.5 | 0.000 | 0.028 |
| 0 | 0.029 | 0.001 |
| 0.5 | 0.059 | −0.025 |
| 1 | 0.088 | −0.052 |
| 1.5 | 0.117 | −0.078 |
| 2 | 0.147 | −0.104 |
| 2.5 | 0.176 | −0.131 |
| 3 | 0.205 | −0.157 |
| 3.5 | 0.234 | −0.183 |
| 4 | 0.262 | −0.210 |
| 4.5 | 0.291 | −0.236 |
| 5 | 0.320 | −0.262 |
| 5.5 | 0.348 | −0.288 |
| 6 | 0.376 | −0.313 |

TABLE 7-continued

Coefficients of lift and pitching moment by angle of attack

| AoA | CL | Cm |
|---|---|---|
| 6.5 | 0.404 | −0.339 |
| 7 | 0.432 | −0.365 |
| 7.5 | 0.460 | −0.390 |
| 8 | 0.488 | −0.416 |
| 8.5 | 0.515 | −0.441 |
| 9 | 0.543 | −0.466 |
| 9.5 | 0.570 | −0.491 |
| 10 | 0.597 | −0.516 |
| 10.5 | 0.624 | −0.540 |
| 11 | 0.650 | −0.565 |
| 11.5 | 0.677 | −0.589 |
| 12 | 0.703 | −0.613 |
| 12.5 | 0.729 | −0.637 |
| 13 | 0.755 | −0.660 |
| 13.5 | 0.781 | −0.684 |
| 14 | 0.806 | −0.707 |
| 14.5 | 0.831 | −0.730 |
| 15 | 0.857 | −0.753 |

The coefficients in Table 7 are determined by a linear model (without taking into account the flow separation phenomena), and the moments are reduced to the point 0.0, which lies in the nose portion of the fuselage (they must be specified for appropriate centering).

Flow separation phenomena significantly affect the characteristics at low flow speeds, cause flow separation, and, when the flight speed decreases, they resulted in the phenomenon of stalling and falling of the aerial vehicle.

The aerodynamic characteristics, which are obtained taking into account flow separation at the speed of 40 m/s, are determined in the ANSYS Fluent program. The result is given in Table 8.

TABLE 8

Aerodynamic coefficients calculated by the ANSYS

| AoA | CL | CD | K | Cm |
|---|---|---|---|---|
| 0 | 0.105 | 0.0194 | 5.43 | −0.019 |
| 1 | 0.172 | 0.0207 | 8.29 | −0.042 |
| 2 | 0.237 | 0.0232 | 10.24 | −0.065 |
| 4 | 0.368 | 0.0306 | 12.05 | −0.112 |
| 5 | 0.435 | 0.0363 | 11.98 | −0.136 |
| 6 | 0.499 | 0.0429 | 11.64 | −0.159 |
| 7 | 0.567 | 0.0501 | 11.32 | −0.184 |
| 8 | 0.631 | 0.0586 | 10.77 | −0.208 |
| 9 | 0.696 | 0.0687 | 10.14 | −0.233 |
| 10 | 0.759 | 0.0803 | 9.45 | −0.257 |
| 11 | 0.817 | 0.0931 | 8.78 | −0.279 |
| 12 | 0.870 | 0.1072 | 8.12 | −0.297 |
| 13 | 0.912 | 0.1219 | 7.48 | −0.307 |
| 14 | 0.940 | 0.1368 | 6.87 | −0.310 |
| 15 | 0.956 | 0.1512 | 6.32 | −0.307 |
| 16 | 0.967 | 0.1665 | 5.81 | −0.306 |
| 17 | 0.972 | 0.1819 | 5.34 | −0.305 |

For ease of comparison, all the coefficients have been reduced to the following values:

| | | |
|---|---|---|
| V | 40 | $_M/c$ |
| S | 0.6266 | $_M{}^2$ |
| $b_a$ | 0.463 | $_M{}^2$ |
| $x_a$ | 0.2124 | $_M{}^2$ |

When determining the phenomenon of balancing by speed, it is first determined the coordinate of the lift focus by the angle of attack:

$$x_F = \frac{m_z^a}{c_y^a}$$

The values of the derivatives and the results of the determination would slightly vary according to the data of different programs, and they are given in Table 9.

TABLE 9

Determination of the focal coordinates

| | ANSYS $_{Bap}.1$ | ANSYS $_{Bap}.2$ | XFLR5 | PANSYM |
|---|---|---|---|---|
| $m_z^\alpha$ | −0.0233 | −0.0238 | −0.0187 | −0.0193 |
| $c_y^\alpha$ | 0.0696 | 0.0658 | 0.0579 | 0.0615 |
| $X_F$ | 0.3348 | 0.3617 | 0.3229 | 0.3138 |

Figure 3:
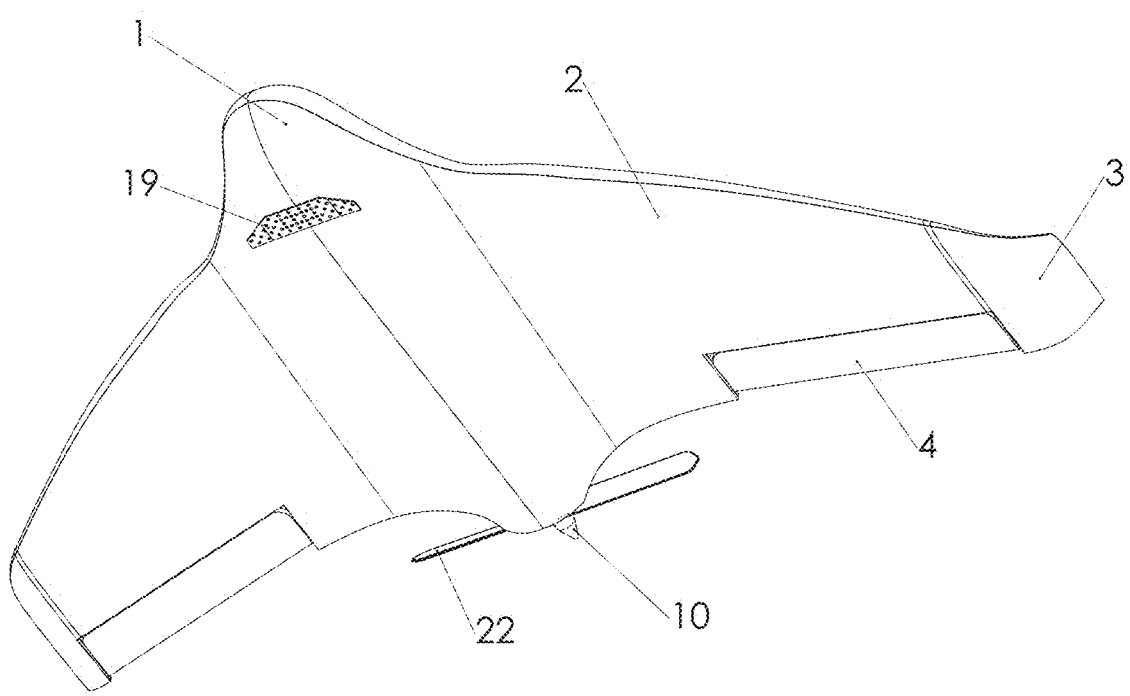
FIG. 3 is a design and layout diagram of a multi-purpose unmanned aerial vehicle of the "flying wing" type, bottom view.
Figure 4:
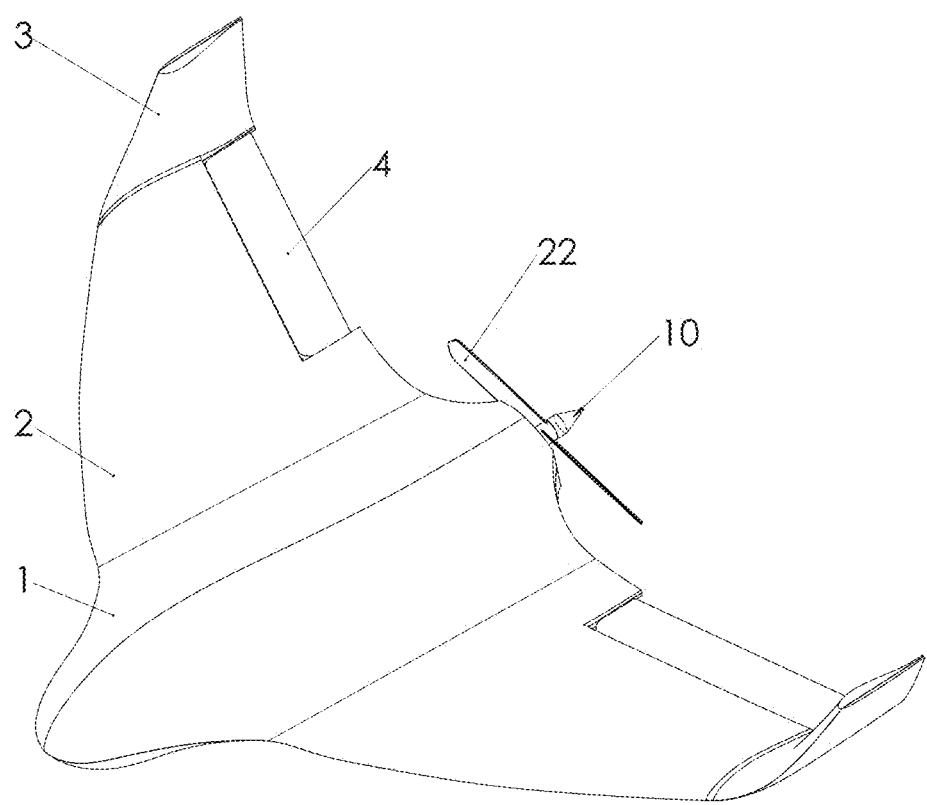
FIG. 4 is a design and layout diagram of a multi-purpose unmanned aerial vehicle of the "flying wing" type, top view.

The obtained value varies in the range of 0.31 . . . 0.36% of the mean aerodynamic chord (MAC) of the wing. There is more confidence for the more rearward placement, since this result has been determined by the program, which takes into account the influence of viscosity and flow separation. Balancing was determined using the XFLR5 program (FIG. 3). This allows simulating a flying wing with deflected rudders.

The arrays of the values for the aerodynamic coefficients cx, cy, mz have been determined as functions of two variables, namely, the angle of attack in the range of −5 . . . 15° and the angle of deflection of the control surface in the range of −25 . . . 25° (a negative value corresponds to a downward deflection). The results are given in Tables 10, 11, and 12.

TABLE 10

Lift coefficient of $c_y = (\alpha\ \delta B)$

| | $\delta_B$ | | | | | | | | | | |
|---|---|---|---|---|---|---|---|---|---|---|---|
| α | 25 | 20 | 15 | 10 | 5 | 0 | −5 | −10 | −15 | −20 | −25 |
| −5 | 0.1242 | 0.0297 | −0.0689 | −0.1686 | −0.2686 | −0.3685 | −0.4667 | −0.5624 | −0.6494 | −0.6942 | −0.7285 |
| −4 | 0.1829 | 0.0890 | −0.0092 | −0.1087 | −0.2088 | −0.3089 | −0.4075 | −0.5038 | −0.5925 | −0.6404 | −0.6737 |
| −3 | 0.2418 | 0.1489 | 0.0508 | −0.0489 | −0.1490 | −0.2492 | −0.3482 | −0.4450 | −0.5352 | −0.5866 | −0.6187 |
| −2 | 0.2999 | 0.2085 | 0.1106 | 0.0109 | −0.0894 | −0.1896 | −0.2888 | −0.3861 | −0.4777 | −0.5333 | −0.5639 |
| −1 | 0.3557 | 0.2673 | 0.1699 | 0.0703 | −0.0300 | −0.1303 | −0.2297 | −0.3274 | −0.4201 | −0.4797 | −0.5096 |
| 0 | 0.4054 | 0.3250 | 0.2286 | 0.1294 | 0.0292 | −0.0715 | −0.1708 | −0.2688 | −0.3626 | −0.4264 | −0.4559 |
| 1 | 0.4519 | 0.3816 | 0.2867 | 0.1880 | 0.0880 | −0.0130 | −0.1123 | −0.2105 | −0.3051 | −0.3737 | −0.4022 |
| 2 | 0.5006 | 0.4378 | 0.3443 | 0.2463 | 0.1465 | 0.0454 | −0.0540 | −0.1522 | −0.2474 | −0.3205 | −0.3486 |
| 3 | 0.5530 | 0.4937 | 0.4017 | 0.3043 | 0.2046 | 0.1033 | 0.0038 | −0.0936 | −0.1890 | −0.2664 | −0.2923 |
| 4 | 0.6061 | 0.5495 | 0.4588 | 0.3619 | 0.2623 | 0.1612 | 0.0613 | −0.0354 | −0.1304 | −0.2086 | −0.2306 |
| 5 | 0.6586 | 0.6045 | 0.5152 | 0.4190 | 0.3195 | 0.2187 | 0.1184 | 0.0226 | −0.0709 | −0.1511 | −0.1670 |
| 6 | 0.7107 | 0.6590 | 0.5711 | 0.4757 | 0.3762 | 0.2759 | 0.1756 | 0.0808 | −0.0110 | −0.0903 | −0.1038 |
| 7 | 0.7615 | 0.7121 | 0.6260 | 0.5314 | 0.4323 | 0.3325 | 0.2326 | 0.1385 | 0.0486 | −0.0287 | −0.0413 |
| 8 | 0.8112 | 0.7640 | 0.6799 | 0.5862 | 0.4878 | 0.3884 | 0.2898 | 0.1959 | 0.1081 | 0.0325 | 0.0204 |
| 9 | 0.8598 | 0.8145 | 0.7331 | 0.6403 | 0.5427 | 0.4439 | 0.3464 | 0.2533 | 0.1676 | 0.0933 | 0.0816 |
| 10 | 0.9069 | 0.8634 | 0.7854 | 0.6935 | 0.5969 | 0.4991 | 0.4024 | 0.3111 | 0.2270 | 0.1531 | 0.1416 |
| 11 | 0.9517 | 0.9100 | 0.8366 | 0.7459 | 0.6504 | 0.5536 | 0.4576 | 0.3687 | 0.2858 | 0.2118 | 0.2006 |
| 12 | 0.9848 | 0.9511 | 0.8859 | 0.7972 | 0.7031 | 0.6074 | 0.5126 | 0.4262 | 0.3436 | 0.2682 | 0.2577 |
| 13 | 1.0112 | 0.9798 | 0.9343 | 0.8475 | 0.7551 | 0.6607 | 0.5680 | 0.4832 | 0.3991 | 0.3184 | 0.3137 |
| 14 | 1.0436 | 1.0076 | 0.9831 | 0.8963 | 0.8062 | 0.7135 | 0.6237 | 0.5383 | 0.4494 | 0.3584 | 0.3696 |
| 15 | 1.0734 | 1.0460 | 1.0331 | 0.9461 | 0.8565 | 0.7667 | 0.6792 | 0.5904 | 0.4887 | 0.3981 | 0.4269 |

TABLE 11

Resistance coefficient $c = (\alpha\ \delta B)$

| | $\delta_B$ | | | | | | | | | | |
|---|---|---|---|---|---|---|---|---|---|---|---|
| α | 25 | 20 | 15 | 10 | 5 | 0 | −5 | −10 | −15 | −20 | −25 |
| −5 | 0.0374 | 0.0288 | 0.0233 | 0.0209 | 0.0215 | 0.0249 | 0.0322 | 0.0419 | 0.0536 | 0.0631 | 0.0735 |
| −4 | 0.0393 | 0.0297 | 0.0230 | 0.0194 | 0.0190 | 0.0212 | 0.0274 | 0.0361 | 0.0469 | 0.0562 | 0.0663 |
| −3 | 0.0419 | 0.0312 | 0.0234 | 0.0186 | 0.0170 | 0.0182 | 0.0233 | 0.0309 | 0.0408 | 0.0498 | 0.0596 |
| −2 | 0.0449 | 0.0333 | 0.0243 | 0.0184 | 0.0156 | 0.0157 | 0.0197 | 0.0262 | 0.0352 | 0.0440 | 0.0534 |
| −1 | 0.0482 | 0.0359 | 0.0258 | 0.0188 | 0.0149 | 0.0136 | 0.0166 | 0.0220 | 0.0301 | 0.0385 | 0.0476 |
| 0 | 0.0516 | 0.0390 | 0.0280 | 0.0198 | 0.0147 | 0.0122 | 0.0141 | 0.0184 | 0.0255 | 0.0335 | 0.0423 |
| 1 | 0.0550 | 0.0427 | 0.0306 | 0.0214 | 0.0151 | 0.0113 | 0.0121 | 0.0154 | 0.0215 | 0.0290 | 0.0375 |
| 2 | 0.0589 | 0.0469 | 0.0339 | 0.0235 | 0.0161 | 0.0109 | 0.0107 | 0.0128 | 0.0179 | 0.0250 | 0.0330 |
| 3 | 0.0637 | 0.0515 | 0.0377 | 0.0262 | 0.0175 | 0.0110 | 0.0098 | 0.0109 | 0.0149 | 0.0215 | 0.0294 |
| 4 | 0.0691 | 0.0568 | 0.0421 | 0.0295 | 0.0196 | 0.0119 | 0.0094 | 0.0095 | 0.0126 | 0.0187 | 0.0263 |
| 5 | 0.0748 | 0.0624 | 0.0469 | 0.0333 | 0.0222 | 0.0132 | 0.0096 | 0.0087 | 0.0109 | 0.0165 | 0.0239 |
| 6 | 0.0810 | 0.0684 | 0.0522 | 0.0376 | 0.0252 | 0.0151 | 0.0104 | 0.0085 | 0.0098 | 0.0147 | 0.0222 |

TABLE 11-continued

Resistance coefficient c = (α δB)

| | $\delta_B$ | | | | | | | | | | |
|---|---|---|---|---|---|---|---|---|---|---|---|
| α | 25 | 20 | 15 | 10 | 5 | 0 | −5 | −10 | −15 | −20 | −25 |
| 7 | 0.0874 | 0.0747 | 0.0578 | 0.0423 | 0.0288 | 0.0175 | 0.0118 | 0.0088 | 0.0092 | 0.0133 | 0.0210 |
| 8 | 0.0942 | 0.0813 | 0.0638 | 0.0473 | 0.0328 | 0.0202 | 0.0136 | 0.0096 | 0.0091 | 0.0123 | 0.0203 |
| 9 | 0.1012 | 0.0881 | 0.0702 | 0.0527 | 0.0372 | 0.0235 | 0.0160 | 0.0109 | 0.0096 | 0.0121 | 0.0200 |
| 10 | 0.1084 | 0.0953 | 0.0770 | 0.0585 | 0.0420 | 0.0277 | 0.0187 | 0.0129 | 0.0107 | 0.0124 | 0.0200 |
| 11 | 0.1161 | 0.1025 | 0.0841 | 0.0646 | 0.0472 | 0.0321 | 0.0219 | 0.0154 | 0.0124 | 0.0132 | 0.0205 |
| 12 | 0.1250 | 0.1105 | 0.0916 | 0.0711 | 0.0528 | 0.0367 | 0.0254 | 0.0185 | 0.0146 | 0.0144 | 0.0216 |
| 13 | 0.1342 | 0.1194 | 0.0994 | 0.0783 | 0.0590 | 0.0419 | 0.0300 | 0.0225 | 0.0176 | 0.0164 | 0.0227 |
| 14 | 0.1414 | 0.1274 | 0.1064 | 0.0855 | 0.0654 | 0.0477 | 0.0353 | 0.0271 | 0.0213 | 0.0184 | 0.0229 |
| 15 | 0.1479 | 0.1332 | 0.1125 | 0.0920 | 0.0720 | 0.0541 | 0.0416 | 0.0324 | 0.0249 | 0.0196 | 0.0223 |

TABLE 12

Pitch moment coefficient mz = (α δB)

| | $\delta_B$ | | | | | | | | | | |
|---|---|---|---|---|---|---|---|---|---|---|---|
| α | 25 | 20 | 15 | 10 | 5 | 0 | −5 | −10 | −15 | −20 | −25 |
| −5 | −0.1057 | −0.0168 | 0.0764 | 0.1711 | 0.2663 | 0.3610 | 0.4548 | 0.5457 | 0.6278 | 0.6684 | 0.6995 |
| −4 | −0.1578 | −0.0693 | 0.0237 | 0.1183 | 0.2136 | 0.3086 | 0.4028 | 0.4944 | 0.5781 | 0.6216 | 0.6519 |
| −3 | −0.2101 | −0.1225 | −0.0295 | 0.0653 | 0.1607 | 0.2559 | 0.3505 | 0.4425 | 0.5278 | 0.5745 | 0.6037 |
| −2 | −0.2619 | −0.1757 | −0.0828 | 0.0121 | 0.1077 | 0.2028 | 0.2977 | 0.3903 | 0.4769 | 0.5275 | 0.5555 |
| −1 | −0.3117 | −0.2284 | −0.1359 | −0.0410 | 0.0546 | 0.1499 | 0.2449 | 0.3380 | 0.4258 | 0.4801 | 0.5074 |
| 0 | −0.3560 | −0.2803 | −0.1887 | −0.0942 | 0.0015 | 0.0971 | 0.1922 | 0.2855 | 0.3744 | 0.4328 | 0.4596 |
| 1 | −0.3972 | −0.3312 | −0.2410 | −0.1470 | −0.0515 | 0.0446 | 0.1397 | 0.2332 | 0.3229 | 0.3859 | 0.4117 |
| 2 | −0.4404 | −0.3818 | −0.2931 | −0.1997 | −0.1044 | −0.0078 | 0.0871 | 0.1807 | 0.2710 | 0.3385 | 0.3637 |
| 3 | −0.4876 | −0.4323 | −0.3451 | −0.2523 | −0.1571 | −0.0600 | 0.0346 | 0.1273 | 0.2177 | 0.2895 | 0.3118 |
| 4 | −0.5355 | −0.4828 | −0.3969 | −0.3046 | −0.2096 | −0.1124 | −0.0177 | 0.0740 | 0.1638 | 0.2364 | 0.2542 |
| 5 | −0.5829 | −0.5327 | −0.4482 | −0.3566 | −0.2617 | −0.1645 | −0.0699 | 0.0209 | 0.1090 | 0.1833 | 0.1943 |
| 6 | −0.6303 | −0.5823 | −0.4991 | −0.4083 | −0.3135 | −0.2167 | −0.1222 | −0.0326 | 0.0534 | 0.1267 | 0.1345 |
| 7 | −0.6765 | −0.6307 | −0.5492 | −0.4593 | −0.3648 | −0.2685 | −0.1745 | −0.0858 | −0.0020 | 0.0688 | 0.0754 |
| 8 | −0.7219 | −0.6782 | −0.5984 | −0.5093 | −0.4157 | −0.3195 | −0.2272 | −0.1388 | −0.0577 | 0.0111 | 0.0170 |
| 9 | −0.7663 | −0.7243 | −0.6472 | −0.5589 | −0.4660 | −0.3705 | −0.2794 | −0.1921 | −0.1135 | −0.0464 | −0.0411 |
| 10 | −0.8096 | −0.7693 | −0.6951 | −0.6077 | −0.5156 | −0.4213 | −0.3309 | −0.2458 | −0.1693 | −0.1031 | −0.0983 |
| 11 | −0.8513 | −0.8123 | −0.7421 | −0.6558 | −0.5646 | −0.4714 | −0.3818 | −0.2996 | −0.2248 | −0.1588 | −0.1545 |
| 12 | −0.8847 | −0.8514 | −0.7878 | −0.7027 | −0.6129 | −0.5206 | −0.4323 | −0.3534 | −0.2795 | −0.2123 | −0.2089 |
| 13 | −0.9126 | −0.8813 | −0.8324 | −0.7491 | −0.6605 | −0.5693 | −0.4837 | −0.4072 | −0.3323 | −0.2606 | −0.2621 |
| 14 | −0.9438 | −0.9095 | −0.8765 | −0.7937 | −0.7072 | −0.6178 | −0.5357 | −0.4595 | −0.3810 | −0.2996 | −0.3146 |
| 15 | −0.9723 | −0.9443 | −0.9213 | −0.8388 | −0.7530 | −0.6671 | −0.5884 | −0.5100 | −0.4201 | −0.3380 | −0.3677 |

Figure 12:
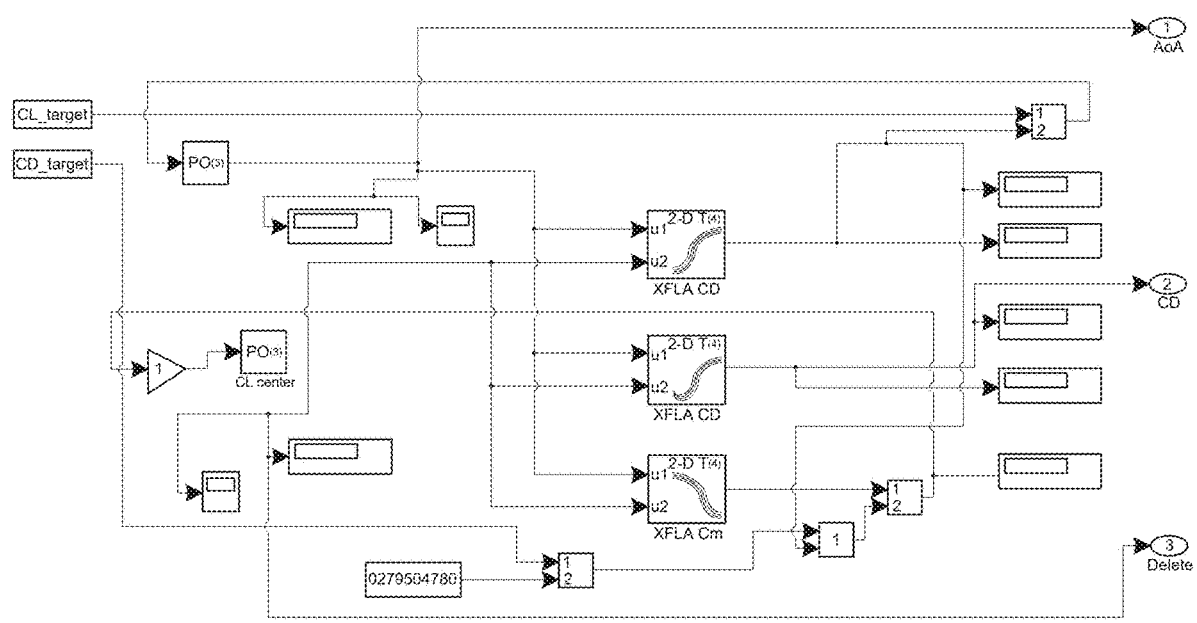
FIG. 12 is a design and layout diagram of a multi-purpose unmanned aerial vehicle of the "flying wing" type, the scheme in Simulink for balancing solution.

Balancing was carried out as a search for a solution to the following system of equations:

$$\begin{cases} c_y = f(\alpha, \delta_B) = c_{y6an} \\ m_z = f(\alpha, \delta_B) = 0 \end{cases}$$

Where cy bal varied in the range of 0 ... 1.2, and to determine mz, the new position of the center of gravity was taken into account in the MATLAB Simulink program using the PID controller (since the block sometimes gave an error). The Simulink calculation scheme is shown in (FIG. 12). The corresponding table arrays are brought into the 2D Look-up Table.

The results are given in Tables 13 and 14 (For the angle of deviation of the elevron and by flight speed).

TABLE 13

The values of the angle of deviation of the elevron δB

| | Centering, % MAC | | | | | | | |
|---|---|---|---|---|---|---|---|---|
| $c_{y\,bal}$ | 0.15 | 0.16 | 0.17 | 0.18 | 0.19 | 0.2 | 0.21 | 0.22 |
| 0 | 19.12 | 19.15 | 19.18 | 19.21 | 19.24 | 19.26 | 19.29 | 19.32 |
| 0.05 | 14.49 | 14.79 | 15.10 | 15.42 | 15.73 | 16.04 | 16.35 | 16.66 |
| 0.1 | 9.45 | 10.04 | 10.63 | 11.24 | 11.85 | 12.47 | 13.09 | 13.72 |
| 0.15 | 4.35 | 5.30 | 6.21 | 7.10 | 7.99 | 8.89 | 9.77 | 10.66 |
| 0.2 | −0.96 | 0.24 | 1.32 | 2.42 | 3.64 | 4.93 | 6.21 | 7.45 |
| 0.25 | −7.66 | −5.74 | −3.90 | −2.14 | −0.39 | 1.18 | 2.64 | 4.01 |
| 0.3 | −16.55 | −13.59 | −10.88 | −8.37 | −5.89 | −3.51 | −1.27 | 0.62 |
| 0.35 | −29.83 | −25.00 | −20.38 | −16.32 | −12.73 | −9.59 | −6.67 | −3.74 |
| 0.4 | −44.70 | −39.06 | −33.44 | −28.01 | −22.47 | −17.29 | −12.76 | −8.96 |

TABLE 13-continued

| $c_{y\,bal}$ | | | | | | | | |
|---|---|---|---|---|---|---|---|---|
| 0.45 | | | | | −32.21 | −28.18 | −21.89 | −15.84 |
| 0.5 | | | | | | −39.04 | −32.38 | −25.63 |
| 0.55 | | | | | | −49.64 | −42.45 | −35.25 |
| 0.6 | | | | | | −59.99 | −52.12 | −44.38 |
| 0.65 | | | | | | | | |
| 0.7 | | | | | | | | |
| 0.75 | | | | | | | | |
| 0.8 | | | | | | | | |
| 0.85 | | | | | | | | |
| 0.9 | | | | | | | | |
| 0.95 | | | | | | | | |
| 1 | | | | | | | | |
| 1.05 | | | | | | | | |
| 1.1 | | | | | | | | |
| 1.15 | | | | | | | | |

The values of the angle of deviation of the elevron δB

| | Centering, % MAC | | | | | | | |
|---|---|---|---|---|---|---|---|---|
| $c_{y\,bal}$ | 0.23 | 0.24 | 0.25 | 0.26 | 0.27 | 0.28 | 0.29 | 0.3 |
| 0 | 19.35 | 19.39 | 19.42 | 19.44 | 19.47 | 19.51 | 19.54 | 19.56 |
| 0.05 | 16.98 | 17.29 | 17.61 | 17.92 | 18.24 | 18.55 | 18.87 | 19.19 |
| 0.1 | 14.35 | 14.99 | 15.62 | 16.24 | 16.86 | 17.48 | 18.10 | 18.72 |
| 0.15 | 11.56 | 12.49 | 13.42 | 14.36 | 15.30 | 16.24 | 17.18 | 18.12 |
| 0.2 | 8.66 | 9.88 | 11.12 | 12.37 | 13.63 | 14.91 | 16.17 | 17.43 |
| 0.25 | 5.45 | 7.05 | 8.63 | 10.18 | 11.75 | 13.37 | 15.00 | 16.63 |
| 0.3 | 2.41 | 4.32 | 6.11 | 7.96 | 9.86 | 11.75 | 13.68 | 15.66 |
| 0.35 | −0.92 | 1.39 | 3.39 | 5.56 | 7.87 | 10.14 | 12.42 | 14.70 |
| 0.4 | −5.62 | −2.27 | 0.59 | 3.16 | 5.56 | 8.25 | 10.94 | 13.64 |
| 0.45 | −10.63 | −6.41 | −2.74 | 0.76 | 3.51 | 6.28 | 9.34 | 12.42 |
| 0.5 | −18.42 | −11.71 | −6.41 | −2.33 | 1.32 | 4.55 | 7.76 | 11.14 |
| 0.55 | −28.07 | −20.18 | −12.01 | −5.73 | −0.99 | 2.56 | 6.17 | 9.85 |
| 0.6 | −36.83 | −29.27 | −20.77 | −11.20 | −4.19 | 0.58 | 4.46 | 8.53 |
| 0.65 | | | −29.15 | −19.75 | −8.69 | −1.33 | 2.82 | 7.08 |
| 0.7 | | | −36.33 | −27.97 | −17.11 | −4.86 | 1.57 | 5.85 |
| 0.75 | | | −42.93 | −34.53 | −25.65 | −12.23 | −0.19 | 4.69 |
| 0.8 | | | −49.08 | −40.33 | −31.75 | −21.42 | −4.82 | 3.52 |
| 0.85 | | | −54.93 | −45.67 | −36.88 | −27.92 | −12.82 | 2.02 |
| 0.9 | | | −60.53 | −50.71 | −41.50 | −32.67 | −21.78 | −0.40 |
| 0.95 | | | −65.96 | −55.53 | −45.80 | −36.74 | −27.46 | −6.73 |
| 1 | | | −71.29 | −60.15 | −49.87 | −40.43 | −31.42 | −16.43 |
| 1.05 | | | | | | | | −24.11 |
| 1.1 | | | | | | | | −28.22 |
| 1.15 | | | | | | | | −31.16 |

TABLE 14

Determined values for angle of attack

| | Centering, % MAC | | | | | | | | Centering, % MAC |
|---|---|---|---|---|---|---|---|---|---|
| $C_{y\,bal}$ | 0.15 | 0.16 | 0.17 | 0.18 | 0.19 | 0.2 | 0.21 | 0.22 | |
| 0 | −5.15 | −5.16 | −5.17 | −5.18 | −5.19 | −5.20 | −5.21 | −5.22 | |
| 0.05 | −2.80 | −2.90 | −3.00 | −3.11 | −3.21 | −3.31 | −3.41 | −3.51 | |
| 0.1 | −0.28 | −0.47 | −0.67 | −0.88 | −1.08 | −1.29 | −1.50 | −1.71 | |
| 0.15 | 2.30 | 1.97 | 1.66 | 1.36 | 1.06 | 0.76 | 0.46 | 0.17 | |
| 0.2 | 5.00 | 4.59 | 4.21 | 3.83 | 3.41 | 2.96 | 2.52 | 2.10 | |
| 0.25 | 8.14 | 7.51 | 6.89 | 6.28 | 5.68 | 5.13 | 4.62 | 4.15 | |
| 0.3 | 11.55 | 10.77 | 10.01 | 9.25 | 8.44 | 7.64 | 6.86 | 6.20 | |
| 0.35 | 13.57 | 13.66 | 13.64 | 12.38 | 11.39 | 10.49 | 9.58 | 8.61 | |
| 0.4 | 13.86 | 13.98 | 14.13 | 14.38 | 14.81 | 13.65 | 12.27 | 11.17 | |
| 0.45 | | | | | | 15.13 | 16.00 | 14.18 | |
| 0.5 | | | | | | 14.95 | 15.42 | 16.30 | |
| 0.55 | | | | | | 14.88 | 15.22 | 15.74 | |
| 0.6 | | | | | | 14.84 | 15.13 | 15.52 | |
| 0.65 | | | | | | | | | |
| 0.7 | | | | | | | | | |
| 0.75 | | | | | | | | | |
| 0.8 | | | | | | | | | |
| 0.85 | | | | | | | | | |
| 0.9 | | | | | | | | | |
| 0.95 | | | | | | | | | |
| 1 | | | | | | | | | |
| 1.05 | | | | | | | | | |

TABLE 14-continued 1.1
1.15

| | Determined values for angle of attack | | | | | | | | |
|---|---|---|---|---|---|---|---|---|---|
| | Centering, % MAC | | | | | | | | Centering, |
| $C_{y\,bal}$ | 0.23 | 0.24 | 0.25 | 0.26 | 0.27 | 0.28 | 0.29 | 0.3 | % MAC |
| 0 | −5.23 | −5.24 | −5.25 | −5.26 | −5.27 | −5.28 | −5.29 | −5.30 | |
| 0.05 | −3.61 | −3.71 | −3.82 | −3.92 | −4.02 | −4.12 | −4.23 | −4.33 | |
| 0.1 | −1.92 | −2.13 | −2.34 | −2.54 | −2.74 | −2.94 | −3.14 | −3.34 | |
| 0.15 | −0.14 | −0.45 | −0.76 | −1.07 | −1.39 | −1.70 | −2.00 | −2.30 | |
| 0.2 | 1.69 | 1.28 | 0.86 | 0.44 | 0.02 | −0.41 | −0.82 | −1.23 | |
| 0.25 | 3.65 | 3.10 | 2.57 | 2.04 | 1.52 | 0.97 | 0.42 | −0.12 | |
| 0.3 | 5.58 | 4.91 | 4.29 | 3.66 | 3.01 | 2.38 | 1.73 | 1.07 | |
| 0.35 | 7.63 | 6.82 | 6.12 | 5.36 | 4.56 | 3.78 | 3.02 | 2.26 | |
| 0.4 | 10.13 | 8.99 | 8.00 | 7.09 | 6.25 | 5.31 | 4.39 | 3.48 | |
| 0.45 | 12.54 | 11.27 | 10.06 | 8.84 | 7.86 | 6.89 | 5.81 | 4.77 | |
| 0.5 | 16.51 | 13.76 | 12.17 | 10.82 | 9.55 | 8.40 | 7.27 | 6.09 | |
| 0.55 | 16.67 | 18.50 | 14.86 | 12.86 | 11.27 | 10.02 | 8.74 | 7.44 | |
| 0.6 | 16.12 | 17.18 | 19.74 | 15.54 | 13.28 | 11.66 | 10.27 | 8.82 | |
| 0.65 | | | 17.92 | 20.81 | 15.60 | 13.24 | 11.80 | 10.27 | |
| 0.7 | | | 17.24 | 18.98 | 20.86 | 15.29 | 13.19 | 11.66 | |
| 0.75 | | | 16.90 | 18.08 | 20.66 | 19.08 | 14.74 | 13.03 | |
| 0.8 | | | 16.72 | 17.66 | 19.29 | 24.29 | 17.09 | 14.42 | |
| 0.85 | | | 16.60 | 17.43 | 18.71 | 21.27 | 21.55 | 15.90 | |
| 0.9 | | | 16.53 | 17.28 | 18.39 | 20.27 | 26.34 | 17.62 | |
| 0.95 | | | 16.48 | 17.18 | 18.20 | 19.78 | 23.03 | 20.47 | |
| 1 | | | 16.44 | 17.12 | 18.07 | 19.48 | 21.94 | 27.85 | |
| 1.05 | | | | | | | | 27.21 | |
| 1.1 | | | | | | | | 24.86 | |
| 1.15 | | | | | | | | 23.96 | |

As a result, it has been determined that the minimum flight speed at the centering of 0.15, whereas the elevrons are still able to balance the device, is 24 m/s. For the centering of 0.28, this speed is 14 m/s (excluding stalling, purely balancing and the ability to compensate for the pitch moment).

Low compactness indicators in combination with high flight and operational characteristics are the clear advantages of this UAV. When assembled for transportation, the UAV container and the launcher container do not exceed 1.2 m³ and 70 kg. This provides a high degree of mobility: the entire set can fit in the passenger compartment of a car, and the group of two people is required for moving it under extreme conditions.

The use of the UAV is possible on any terrain, on a slope or in the presence of complex terrain (stones, vegetation, etc.). A flat area of 5x⁵ m with any coating is sufficient for the use of the UAV. Pre-launch preparation of the UAV takes no more than 15 minutes.

The UAV allows for rapid monitoring of the environment and infrastructure facilities, providing search and rescue operations, and participating in the protection of large-scale autonomously functioning facilities, such as pipelines, overpasses, etc.

The UAV, in which the proposed invention is implemented, has been repeatedly tested and is ready for serial production.

The invention claimed is:

1. A multi-purpose unmanned aerial vehicle comprising:
   a body configured to include a center section, in which a fuselage is formed as a single unit with wing consoles,
   wings that transition into winglets,
   elevrons integrated into the wings,
   an electric motor having a propeller,
   power supply batteries and electronics,
   wherein the wings have an aerodynamic profile variable in cross-section width and provided with a leading edge and a trailing edge,
   wherein the fuselage has an S-shaped profile equal to a profile of the wings,
   wherein the S-shaped profile of the wings is combined with the S-shaped profile of the fuselage along a peripheral cross-section of the wings,
   wherein a width of the S-shaped profile of the wings is gradually decreasing by scaling to the value of 0.5 relative to a width of the profile in a transition zone from the fuselage to the wing console,
   wherein a portion of the fuselage has an oval shape while gradually wedging and transitioning into a root portion of the wing console,
   wherein the leading edge of the wing console is curved laterally from the wing root portion and is connected to the leading edge of the wing root portion,
   wherein end surfaces of the wing are curved laterally and arranged upward and backward along the trailing edge forming the winglets, the winglets are deflected at an angle of 10-15 degrees,
   wherein the leading edge of the wing transitions into a leading edge of the wing console,
   wherein the trailing edge of the wing is connected to a trailing edge of the wing console in an area of an elevron,
   wherein a trailing edge of the wing root portion is connected to the fuselage behind the elevron,
   wherein the fuselage trailing edge, which connects a rear portion of the wing root portion with a rear portion of the center section of the fuselage, is straight and is connected to the trailing edge of the fuselage at the transition zone from the fuselage to an engine.

2. The multi-purpose unmanned aerial vehicle according to claim 1, wherein the elevron has a form of a parallelogram and has an area of the elevrons within 0.03 to 0.05 of the total area of the wing.

3. The multi-purpose unmanned aerial vehicle according to claim 1, wherein the lower portion of the fuselage includes, a box of a streamlined aerodynamic shape with a bracket for a catapult attached.

4. The multi-purpose unmanned aerial vehicle according to claim 1, wherein the rear portion of the wing, at the point of the transition from the fuselage to the engine group, is a curved radial cutout, which transitions into a linear one.

5. The multi-purpose unmanned aerial vehicle according to claim 1, wherein the wing is formed to have planes, each plane is parallel to a plane of symmetry for the fuselage and the wing with the elevron having a deviation in an angle ±20 degrees up and down.

6. The multi-purpose unmanned aerial vehicle according to claim 1, wherein the wing in a plane is made to have an ogive form, and the trailing edge of the wing has a sweep of the wing within 12 to 18 degrees.

7. The multi-purpose unmanned aerial vehicle according to claim 1, wherein the central portion of the fuselage, includes a box for installing controls, the batteries, as well as a second box, for a payload.

8. The multi-purpose unmanned aerial vehicle according to claim 1, wherein a rear portion of the fuselage, includes the electric motor connected to the propeller through an output shaft.

9. The multi-purpose unmanned aerial vehicle according to claim 1, wherein a front portion of the fuselage includes a module for installing video cameras.

10. The multi-purpose unmanned aerial vehicle according to claim 1, wherein a front portion of the fuselage, at the transition zone, includes the power supply batteries.

11. The multi-purpose unmanned aerial vehicle according to claim 1, wherein the wing, at the transition zone, a Java Platform Module (JPS module).

12. The multi-purpose unmanned aerial vehicle according to claim 1, wherein a rear portion of the fuselage includes an electrical module, an initiation plane, and an air speed sensor.

13. The multi-purpose unmanned aerial vehicle according to claim 1, wherein a front portion of the wing, at the transition zone, includes a Pitot tube.

14. The multi-purpose unmanned aerial vehicle according to claim 1, wherein the wings include, at the transition zone, video transmitters.

15. The multi-purpose unmanned aerial vehicle according to claim 1, wherein the aerodynamic profile of the wings are variable based on the following equation:

$$y = \sum_{n=1}^{7} a_n x^{n-\frac{1}{2}},$$

which is written in the form of $$y = a1x^{0.5} + a2x^{1.5} + a3x^{2.5} + a4x^{3.5} + a5x^{4.5} + a5x^{4.5} + a6x^{5.5} + a7x^{6.5},$$

and coefficients of a1 ... a7 are used for an upper and a lower edges.

* * * * *